US011288857B2

United States Patent
Meshry et al.

(10) Patent No.: US 11,288,857 B2
(45) Date of Patent: Mar. 29, 2022

(54) NEURAL RERENDERING FROM 3D MODELS

(71) Applicant: Google LLC, Mountain View, CA (US)

(72) Inventors: Moustafa Meshry, Mountain View, CA (US); Ricardo Martin Brualla, Seattle, WA (US); Sameh Khamis, Mountain View, CA (US); Daniel Goldman, Seattle, WA (US); Hugues Hoppe, Mountain View, CA (US); Noah Snavely, Mountain View, CA (US); Rohit Pandey, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/837,612

(22) Filed: Apr. 1, 2020

(65) Prior Publication Data
US 2020/0320777 A1 Oct. 8, 2020

Related U.S. Application Data

(60) Provisional application No. 62/829,478, filed on Apr. 4, 2019.

(51) Int. Cl.
*G06T 15/00* (2011.01)
*G06T 15/20* (2011.01)
(Continued)

(52) U.S. Cl.
CPC ............. *G06T 15/20* (2013.01); *G06N 3/082* (2013.01); *G06T 7/174* (2017.01); *G06T 2207/20081* (2013.01); *G06T 2207/20084* (2013.01)

(58) Field of Classification Search
CPC .......... G06T 2207/20081; G06T 19/20; G06T 2207/20084; G06T 2219/2024; G06T 7/174; G06T 15/20; G06N 3/082
(Continued)

(56) References Cited

U.S. PATENT DOCUMENTS 10,430,978 B2 * 10/2019 Yumer .................. G06T 11/001
10,685,446 B2 * 6/2020 Fleishman ............. H04N 5/247
(Continued)

OTHER PUBLICATIONS

Kang K, Chen Z, Wang J, Zhou K, Wu H. Efficient reflectance capture using an autoencoder. ACM Trans. Graph.. Jul. 30, 2018;37(4):127.*
(Continued)

*Primary Examiner* — Phu K Nguyen
(74) *Attorney, Agent, or Firm* — Brake Hughes Bellermann LLP

(57) ABSTRACT

According to an aspect, a method for neural rerendering includes obtaining a three-dimensional (3D) model representing a scene of a physical space, where the 3D model is constructed from a collection of input images, rendering an image data buffer from the 3D model according to a viewpoint, where the image data buffer represents a reconstructed image from the 3D model, receiving, by a neural rerendering network, the image data buffer, receiving, by the neural rerendering network, an appearance code representing an appearance condition, and transforming, by the neural rerendering network, the image data buffer into a rerendered image with the viewpoint of the image data buffer and the appearance condition specified by the appearance code.

18 Claims, 19 Drawing Sheets

(51) Int. Cl.
   *G06T 7/174* (2017.01)
   *G06N 3/08* (2006.01)
(58) Field of Classification Search
   USPC .......................................................... 345/418
   See application file for complete search history.

(56) References Cited

U.S. PATENT DOCUMENTS

| | | | |
|---|---|---|---|
| 10,692,276 B2* | 6/2020 | Sunkavalli | G06T 19/20 |
| 10,915,731 B2* | 2/2021 | Mccormac | G06K 9/6257 |

OTHER PUBLICATIONS

McCormac J, Handa A, Davison A, Leutenegger S. Semanticfusion: Dense 3d semantic mapping with convolutional neural networks. In2017 IEEE International Conference on Robotics and automation (ICRA) May 29, 2017 (pp. 4628-4635). IEEE.*

Xie J, Kiefel M, Sun MT, Geiger A. Semantic instance annotation of street scenes by 3d to 2d label transfer. InProceedings of the IEEE Conference on Computer Vision and Pattern Recognition 2016 (pp. 3688-3697).*

Xie J, Girshick R, Farhadi A. Deep3d: Fully automatic 2d-to-3d video conversion with deep convolutional neural networks. InEuropean Conference on Computer Vision Oct. 8, 2016 (pp. 842-857). Springer, Cham.*

Xiang Y, Fox D. Da-rnn: Semantic mapping with data associated recurrent neural networks. arXiv preprint arXiv:1703.03098. Mar. 9, 2017.*

Stenborg E, Toft C, Hammarstrand L. Long-term visual localization using semantically segmented images. In2018 IEEE international conference on robotics and automation (ICRA) May 21, 2018 (pp. 6484-6490). IEEE.*

Zaffar, M., Ehsan, S., Milford, M. and McDonald-Maier, K., 2019. CoHOG: A Light-weight, Compute-efficient and Training-free Visual Place Recognition Technique for Changing Environments.*

Zaffar M, Khaliq A, Ehsan S, Milford M, McDonald-Maier K. Levelling the playing field: A comprehensive comparison of visual place recognition approaches under changing conditions. arXiv preprint arXiv:1903.09107. Mar. 21, 2019.*

Yang X, Xie D, Wang X. Crossing-domain generative adversarial networks for unsupervised multi-domain image-to-image translation. InProceedings of the 26th ACM international conference on Multimedia Oct. 15, 2018 (pp. 374-382).*

Wang TC, Liu MY, Zhu JY, Tao A, Kautz J, Catanzaro B. High-resolution image synthesis and semantic manipulation with conditional gans. InProceedings of the IEEE conference on computer vision and pattern recognition 2018 (pp. 8798-8807).*

Zhu JY, Zhang R, Pathak D, Darrell T, Efros AA, Wang O, Shechtman E. Multimodal Image-to-Image Translation by Enforcing Bi-Cycle Consistency. InAdvances in neural information processing systems 2017 (pp. 465-476).*

Liang X, Zhang H, Lin L, Xing E. Generative semantic manipulation with mask-contrasting gan. InProceedings of the European Conference on Computer Vision (ECCV) 2018 (pp. 558-573).*

Agarwal, et al, "Building Rome in a day", ICCV, 2009, 8 pages.

Almahairi, et al, "Augmented CycleGAN: Learning Many-to-Many Mappings from Unpaired Data", ICML, Jun. 2018, 10 pages.

Chen, et al, "DeepLab: Semantic Image Segmentation with Deep Convolutional Nets, Atrous Convolution, and Fully Connected CRFs", IEEE Trans. PAMI, May 2017, 14 pages.

Dong, et al, "Semantic Image Synthesis via Adversarial Learning", ICCV, 2017, pp. 5706-5714.

Eslami, et al, "Neural scene representation and rendering", Science 360, Jun. 2018, pp. 1204-1210.

Furukawa, et al, "Accurate, dense, and robust Multiview stereopsis", IEEE Trans. PAMI, 2010, 8 pages.

Garg, et al, "The dimensionality of scene appearance", ICCV, 2009, 8 pages.

Hauagge, et al, "Reasoning about Photo Collections using Outdoor Illumination Models", BMVC, 2014, 2 pages.

Hedman, et al, "Deep Blending for Free-Viewpoint Image-Based Rendering", ACM Transactions on Graphics, vol. 37, No. 6, Article 257, Nov. 2018, 15 pages.

Hiep, et al, "Towards high-resolution large-scale multi-view stereo", CVPR, Jun. 2009, pp. 1430-1437.

Hold-Geoffroy, et al, "Deep outdoor illumination estimation", CVPR, 2017, pp. 7312-7321.

Huang, et al, "Multimodal Unsupervised Image-to-Image Translation", ECCV, 2018, 18 pages.

Karras, et al, "Progressive Growing of GANs for Improved Quality, Stability, and Variation", ICLR, Feb. 2018, 26 pages.

Kazhdan, et al, "Poisson Surface Reconstruction", Eurographics Symposium on Geometry Processing, 2006, 10 pages.

Kim, et al, "Deep Video Portraits", SIGGRAPH, May 2018, 14 pages.

Kim, et al, "Learning to Discover Cross-Domain Relations with Generative Adversarial Networks", ICML, May 2017, 10 pages.

Laffont, et al, "Coherent Intrinsic Images from Photo Collections", SIGGRAPH Asia 2012, vol. 31, No. 6, 11 pages.

Laffont, et al, "Transient Attributes for High-Level Understanding and Editing of Outdoor Scenes", SIGGRAPH, 2014, 11 pages.

Lee, et al, "Diverse Image-to-Image Translation via Disentangled Representations", ECCV, 2018, 17 pages.

Liu, et al, "Unsupervised Image-to-Image Translation Networks", NeurIPS, 2017, 9 pages.

Mao, et al, "Least Squares Generative Adversarial Networks", ICCV, 2017, 9 pages.

Mordvintsev, et al, "Inceptionism: Going Deeper into Neural Networks", Google AI Blog, Jun. 17, 2015, 5 pages.

Park, et al, "Transformation-Grounded Image Generation Network for Novel 3D View Synthesis", CVPR, 2017, pp. 3500-3509.

Radenovic, et al, "From Dusk till Dawn: Modeling in the Dark", CVPR, 2016, 9 pages.

Rhodin, et al, "Unsupervised Geometry-Aware Representation for 3D Human Pose Estimation", ECCV, 2018, 18 pages.

Saito, et al, "Comprehensible rendering of 3-D shapes", Computer Graphics, vol. 24, No. 4, Aug. 1990, pp. 197-206.

Schönberger, "Colmap", http://colmap.github.io, 2016, 3 pages.

Schönberger, et al, "Pixelwise View Selection for Unstructured Multi-View Stereo", ECCV, 2016, 17 pages.

Schönberger, et al, "Structure-from-Motion Revisited", CVPR, 2016, pp. 4104-4113.

Shan, et al, "The Visual Turing Test for Scene Reconstruction", Proc. 3DV, 2013, 8 pages.

Simonyan, et al, "Very Deep Convolutional Networks for Large-Scale Image Recognition", ISLR 2015, 14 pages.

Snavely, et al, "Photo Tourism: Exploring Photo Collections in 3D", SIGGRAPH, 2006, 12 pages.

Sunkavalli, et al, "Factored Time-Lapse Video", SIGGRAPH, 2007, 10 pages.

Tatarchenko, et al, "Multi-view 3D Models from Single Images with a Convolutional Network", ECCV, Aug. 2016, 20 pages.

Thies, et al, "IGNOR: Image-Guided Neural Object Rendering", ICLR 2020, arXiv:1811.10720, 2018, 16 pages.

Waechter, et al, "Let There Be Color! Large-Scale Texturing of 3D Reconstructions", ECCV, 2014, 15 pages.

Wang, et al, "Generative Image Modeling using Style and Structure Adversarial Networks", ECCV, Jul. 26, 2016, 22 pages.

Wang, et al, "High-Resolution Image Synthesis and Semantic Manipulation with Conditional GANs", CVPR, 2018, pp. 8798-8807.

Wang, et al, "Joint Material and Illumination Estimation from Photo Sets in the Wild", Proc. 3DV, Nov. 2017, 13 pages.

Wang, et al, "Video-to-Video Synthesis", NeurIPS, Dec. 2018, 14 pages.

Zhang, et al, "Age Progression/Regression by Conditional Adversarial Autoencoder", CVPR, 2017, pp. 5810-5818.

Zhou, et al, "Scene Parsing through ADE20K Dataset", CVPR, 2017, pp. 633-641.

Zhu, et al, "Toward Multimodal Image-to-Image Translation", NeurIPS, 2017, 12 pages.

(56) References Cited

OTHER PUBLICATIONS

Debevec, et al., "Modeling and rendering architecture from photographs: A hybrid geometry and image-based approach", SIGGRAPH, 1996, 33 pages.
Gatys, et al., "Image style transfer using convolutional neural networks", CVPR, Jun. 2016, pp. 2414-2423.
Gortler, et al., "The lumigraph", SIGGRAPH, 1996, pp. 43-54.
Isola, et al., "Image-to-Image Translation with Conditional Adversarial Networks", CVPR, 2017, 17 pages.
Johnson, et al., "Perceptual losses for real-time style transfer and super-resolution", ECCV 2016, Mar. 27, 2016, 17 pages.
Ledig, et al., "Photo-Realistic Single Image Super-Resolution Using a Generative Adversarial Network", CVPR, 2017, 19 pages.
Martin-Brualla, "Lookingood: Enhancing performance capture with real-time neural re-rendering", SIGGRAPH Asia, Nov. 12, 2018, 14 pages.
Invitation to Pay Additional Fees and Partial International Search for PCT Application No. PCT/US2020/026319, dated Jun. 25, 2020, 9 pages.
Kim, et al., "Deep Video Portraits", ACM Trans. Graph, vol. 37, No. 4, Article 163, Aug. 2018, 14 pages.
Martin-Brualla, et al., "Lookingood: Enhancing Performance Capture With Real-Time Neural Re-Rendering", ACM Transactions on Graphics, vol. 37, No. 6, Article 255, Nov. 2018, 14 pages.
Meshry, et al., "Neural Rerendering in the Wild", 2019 IEEE/CVF Conference on Computer Vision and Pattern Recognition (CVPR), 2019, 10 pages.
Xu, et al., "Deep Image-Based Relighting From Optimal Sparse Samples", ACM Transactions on Graphics, vol. 37, No. 4, Article 126, Aug. 2018, 13 pages.
Odena, et al, "Deconvolution and Checkerboard Artifacts", Distill 1, No. 10, 2016, 9 pages.
Pathak, et al, "Context Encoders: Feature Learning by Inpainting", CVPR, Nov. 2016, 12 pages.
Zhu, et al., "Unpaired Image-to-Image Translation Using Cycle-Consistent Adversarial Networks", ICCV, Mar. 30, 2017, 18 pages.

* cited by examiner

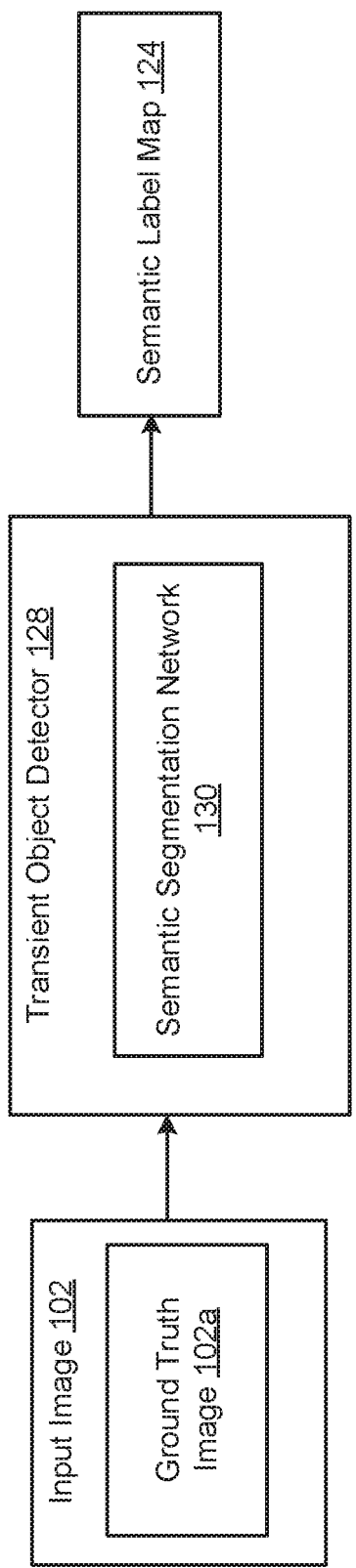
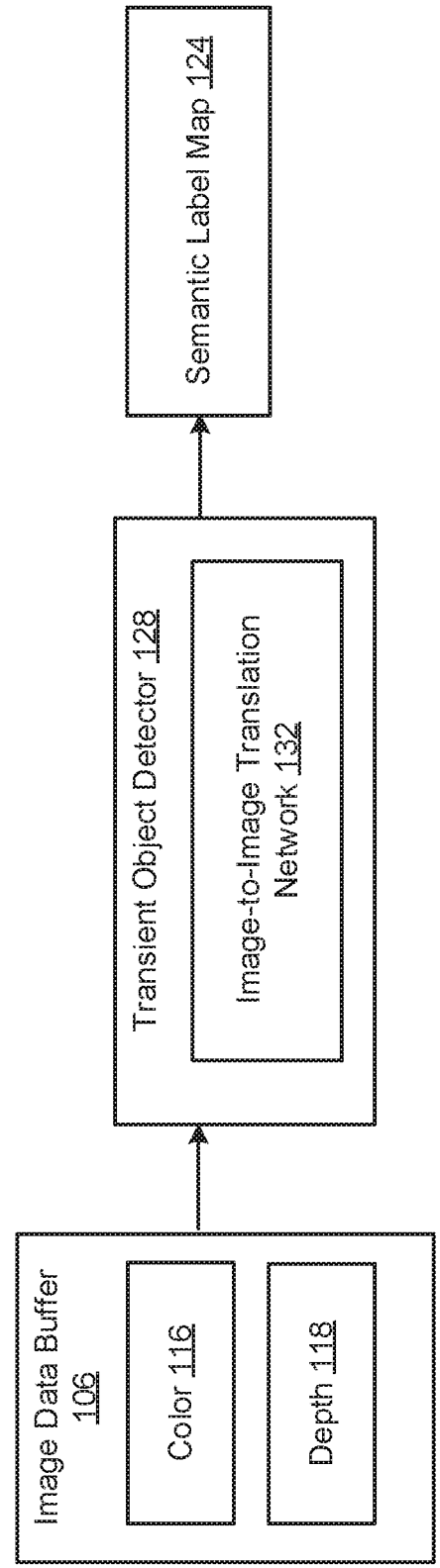

NEURAL RERENDERING FROM 3D MODELS

CROSS-REFERENCE TO RELATED APPLICATION

This application claims priority to U.S. Provisional Patent Application No. 62/829,478, filed on Apr. 4, 2019, entitled "Neural Rerendering in the Wild", which is incorporated herein by reference in its entirety.

TECHNICAL FIELD

This description generally relates to neural rerendering from three-dimensional (3D) models.

BACKGROUND

Recent advances in 3D reconstruction may generate 3D models from photo collections, but the renderings produced from the 3D models may lack the realism and diversity of real-world images. Further, some conventional techniques recover a single appearance or recover an average appearance of the scene, which causes the renderings to look inconsistent or cloudy, and some conventional techniques may hallucinate the location of transient objects. In addition, generating images from 3D models in an outdoor scene is particularly challenging as the outside world looks dramatically different in different weather or time of day, and characterizing these changes with a model (e.g., a single model) is relatively difficult.

SUMMARY

According to an aspect, a method for neural rerendering includes obtaining a three-dimensional (3D) model representing a scene of a physical space, where the 3D model is constructed from a collection of input images, rendering an image data buffer from the 3D model according to a viewpoint, where the image data buffer represents a reconstructed image from the 3D model, receiving, by a neural rerendering network, the image data buffer, receiving, by the neural rerendering network, an appearance code representing an appearance condition, and transforming, by the neural rerendering network, the image data buffer into a rerendered image with the viewpoint of the image data buffer and the appearance condition specified by the appearance code. A non-transitory computer-readable medium and a neural rerendering system are also provided with these operations.

The method (or non-transitory computer-readable medium or neural rerendering system) may include any of the following features (or any combination thereof). In some examples, the appearance condition of the rerendered image is different from an appearance condition of an input image having a viewpoint that is the same as the viewpoint of the rerendered image. In some examples, the appearance condition of the rerendered image is the same as an appearance condition of an input image having a viewpoint that is the same as the viewpoint of the rerendered image. The method may include receiving, by the neural rerendering network, a semantic label map indicating a position of a transient object in the scene, where the transforming includes generating the rerendered image using the semantic label map as a guide such that the transient object is omitted from the rerendered image. The image data buffer may include the semantic label map. The method may include receiving, by an image-to-image translation network, the image data buffer, and generating, by the image-to-image translation network, the semantic label map based on one or more portions of the image data buffer. The image data buffer includes a plurality of layers. The plurality of layers includes a color layer and a depth layer. The transforming includes generating the rerendered image based on the color layer and the depth layer. The method may include generating an aligned dataset using the 3D model, the aligned dataset including a plurality of pairs of images, where each pair includes an input image and an image data buffer rendered from the 3D model, the input image and the image data buffer are from a same point of view, and the image data buffer is pixel aligned with the input image, generating one or more semantic label maps based on portions of the aligned dataset, where the semantic label maps indicate positions of transient objects and non-transient objects, and training the neural rerendering network using the aligned dataset and the semantic label maps. The method may include training an appearance encoder to learn appearance code of the scene using the aligned dataset with triplet loss.

According to an aspect, a non-transitory computer-readable medium storing executable instructions that when executed by at least one processor are configured to cause the at least one processor to obtain a three-dimensional (3D) model representing a scene of a physical space, where the 3D model is constructed from a collection of input images, render an image data buffer from the 3D model according to a viewpoint, where the image data buffer represents a reconstructed image from the 3D model, receive, by a neural rerendering network, the image data buffer, receive, by the neural rerendering network, an appearance code representing an appearance condition, and transform, by the neural rerendering network, the image data buffer into a rerendered image such that the rerendered image has the appearance condition specified by the appearance code and the viewpoint of the image data buffer. A system and method are also provided with these features.

According to some aspects, the non-transitory computer-readable medium (or system or method) may include one or more of the above/below features (or any combination thereof). The executable instructions include instructions that cause the at least one processor to receive, by the neural rerendering network, a semantic label map indicating a position of a transient object in the scene, and generate, by the neural rerendering network, the rerendered image using the semantic label map as a guide such that the transient object is omitted from the rerendered image. The image data buffer includes the semantic label map. The executable instructions include instructions that cause the at least one processor to receive, by an image-to-image translation network, the image data buffer, and generate, by the image-to-image translation network, the semantic label map based on the image data buffer. The executable instructions include instructions that cause the at least one processor to receive, by a semantic segmentation network, a ground truth image related to the image data buffer, and generate, by the semantic segmentation network, the semantic label map based on the ground truth image. The image data buffer includes a plurality of layers, where the plurality of layers includes a color layer and a depth layer, and the instructions to transform include instructions to generate the rerendered image based on the color layer and the depth layer.

According to an aspect, a neural rerendering system includes a three-dimensional (3D) generator configured to generate a 3D model representing a scene of a physical space based on a collection of input images, a neural rerendering network configured to transform an image data buffer rendered from the 3D model to a rerendered image, an appearance encoder configured to encode a plurality of appearance conditions of the scene as appearance code, where the neural rerendering network is configured to receive the appearance code such that modification of the appearance code causes the rendered image to be generated according to different appearance conditions, and a neural network trainer configured to train the neural rerendering network and the appearance encoder using training data. A method and non-transitory computer-readable medium are also provided with these features.

According to some aspects, the neural rerendering system (or the method or the non-transitory computer-readable medium) may include one or more of the above/below features (or any combination thereof). The neural network trainer is configured to the neural rerendering network and the appearance encoder according to a plurality of training stages, where the plurality of training stages includes an appearance training stage in which the appearance encoder is trained, a rerendering training stage in which the neural rerendering network is trained, and a tuning training stage in which the appearance encoder and the neural rerendering network are jointly trained. The 3D model is a point cloud generated from structure-from motion (Sfm) and multi-view stereo (MVS) techniques. The image data buffer includes a plurality of layers, where the plurality of layers includes a color layer, a depth layer, and a semantic label map layer indicating a position of a transient object. The neural rerendering network is a first neural network, and the appearance encoder is a second neural network.

The details of one or more implementations are set forth in the accompanying drawings and the description below. Other features will be apparent from the description and drawings, and from the claims.

BRIEF DESCRIPTION OF THE DRAWINGS

FIG. 4 illustrates a transient object detector having a semantic segmentation network configured to generate a semantic label map according to an aspect.

FIG. 5 illustrates a transient object detector having an image-to-image translation network configured to generate a semantic label map according to an aspect.

DETAILED DESCRIPTION

This disclosure relates to a neural rerendering system that records, models, and rerenders a scene under varying appearance conditions such as season and time of day, which, in some examples, refers to total scene capture. The neural rerendering system may address one or more of the above described difficulties. The neural rerendering system may obtain a collection of photos (e.g., internet photos) of a scene (e.g., an outdoor scene, a tourist landmark) and apply three-dimensional (3D) reconstruction to register the photos and approximate the scene as a 3D model (e.g., a point cloud, a textured mesh). For each photo, the neural rerendering system renders the scene points (if a point cloud is used) into an image data buffer (e.g., a framebuffer, a deep buffer, a G-buffer), and then rerenders the image data buffer as a more realistic image using a neural rerendering network (e.g., a neural network). The neural rerendering network may be considered an image translation network that transforms the image data buffer into a rerendered image, where the rerendered image is a relatively realistic image having a high degree of detail and resolution. The neural rerendering system may train the neural rerendering network to learn the mapping of these initial renderings (e.g., the image data buffers) to the actual photos (e.g., the original input images). The model is evaluated on several datasets of publicly available images spanning a broad range of illumination conditions.

The neural rerendering network also receives appearance code (e.g., a latent appearance vector) and a semantic label map (e.g., a semantic mask) indicating the location of transient objects like pedestrians, where the neural rerendering network may generate multiple outputs having images with different appearance conditions using the image data buffer as an input (e.g., a single input). In some examples, the appearance condition does not need to be the same as the real photograph taken from the same vantage (which has a fixed appearance). For example, the appearance condition of the rerendered image may be different from an appearance condition of an input image (e.g., the corresponding original image) that has a viewpoint that is the same as the viewpoint of the rerendered image. For example, the original image may be sunny, but the rerendered image may be cloudy (or any appearance condition as specified by the appearance code). In some examples, the appearance code is an interpolation of the appearance codes of two input images. It is noted that the rerendered image may be generated according to any type of appearance condition. Further, the conditioning of the neural rerendering network on the semantic label maps may reduce or eliminate the hallucination of locations of transient objects and provide the ability to omit the transient objects (e.g., people) from the rerendered image.

Figure 1:
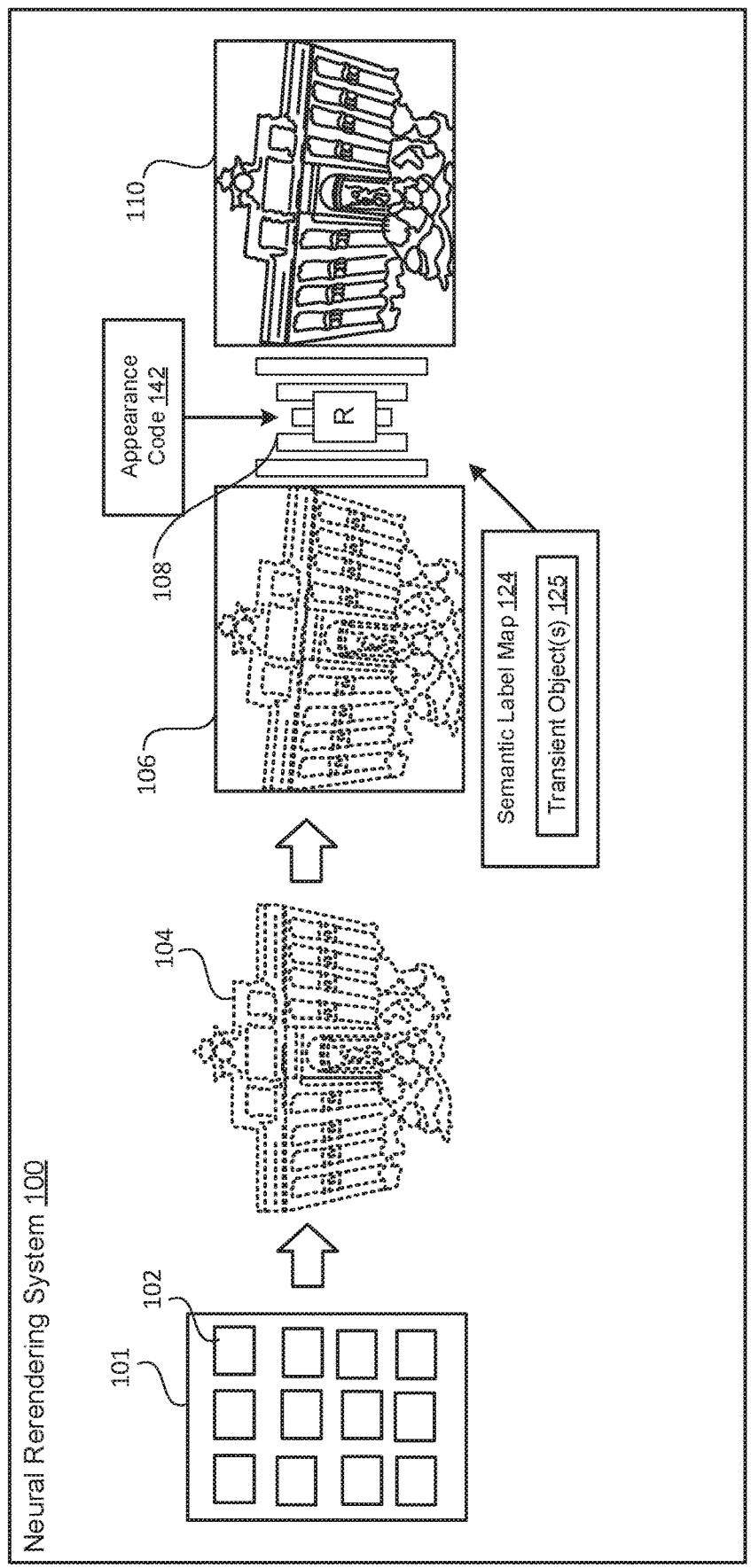
FIG. 1 illustrates a neural rerendering system according to an aspect.

FIGS. 1 through 18 illustrate various aspects of the neural rerendering system 100. FIG. 1 illustrates an example of the neural rerendering system 100 according to an aspect. The neural rerendering system 100 may be trained to render images of a scene (e.g., an outdoor scene) in a plurality (or all) possible lighting and weather conditions with a relatively high level of realism. In some examples, the neural rerendering system 100 is used in virtual reality applications and/or augmented reality applications. In some examples, the neural rerendering system 100 may be used in a video game application. In some examples, the neural rerendering system 100 may be used in image mapping services (e.g., web mapping services). Using a photo collection 101 of input images 102 of a particular scene, the neural rerendering system 100 may capture an appearance space (e.g., a complete appearance space) of the scene by modeling the scene under a plurality of appearance conditions in which the scene may be observed. The appearance conditions may include lighting conditions, weather conditions, and transient states (e.g., rainy, snowy, sunrise, cloudy, crowded with people, etc.). Then, the neural rerendering system 100 may render images from any arbitrary viewpoint of the scene under any appearance condition. In other words, the neural rerendering system 100 may receive a photo collection 101 of input images 102 and generate photo-realistic novel viewpoints under the plurality of appearance conditions represented by appearance code 142.

The techniques discussed herein may overcome several technical challenges, either separately or in combination, due to the sheer diversity of appearance, e.g., scenes can look dramatically different under night illumination, during special events, or in extreme weather. In addition, the techniques discussed herein may overcome several technical challenges, either separately or in combination, for rendering photo-realistic novel viewpoints under a plurality of appearance conditions using publicly available photos (e.g., internet photos) as the input images 102. In some examples, the input images 102 of the photo collection 101 include images from different cameras, images from different times of the day, images having different lighting conditions, images that include transient objects (e.g., people occluders, etc.), and/or images having imperfect calibration. In some examples, the input images 102 include a collection of uncontrolled internet images (e.g., as opposed to carefully captured footage). In some examples, the input images 102 is a community photo collection of a particular scene. To this end, the various techniques discussed herein may be applied either separately or in combination.

The neural rerendering system 100 may generate or construct a three-dimensional (3D) model 104 using the input images 102. The 3D model 104 may be an explicit geometric approximation of the scene. In some examples, the 3D model 104 is considered an explicit intermediate 3D representation, which is used as a "scaffolding" to predict images. The details of the 3D model 104 are further explained with reference to FIG. 2. Then, the neural rerendering system 100 may render an image data buffer 106 from the 3D model 104. The image data buffer 106 may be rendered from the 3D model 104 according to any viewpoint (including new viewpoint not captured by the input images 102). The neural rerendering system 100 may render the 3D model 104 as an image data buffer 106 according to a first viewpoint or render the 3D model 104 as an image data buffer 106 according to a second viewpoint, where the second viewpoint is different from the first viewpoint. Further, the first viewpoint and/or the second viewpoint may be new (e.g., not represented in the input images 102). In some examples, the image data buffers 106 may be considered factored representations of the input images 102, which separates viewpoint, appearance conditions, and transient objects. Realistic images (e.g., rerendered images 110) are rendered from these factored representations.

In some examples, the image data buffer 106 is one or a series of buffers that store information about the scene geometry at the pixel level (e.g., at every pixel). In some examples, the image data buffer 106 is a region of physical memory storage that stores lighting-relevant data. In some examples, the image data buffer 106 is a 3D reconstructed image (e.g., rendered from the 3D model 104). In some examples, the image data buffer 106 is considered a framebuffer (or a deep framebuffer). In some examples, the image data buffer 106 is considered a rough initial image. In some examples, the image data buffer 106 is a deferred shading buffer. In some examples, the image data buffer 106 is a geometry buffer (G-buffer). The details of the image data buffer 106 are further explained with reference to FIG. 3.

Then, the neural rerendering system 100 uses a neural rerendering network 108 to generate a rerendered image 110 from the image data buffer 106. The neural rerendering network 108 may transform an approximate initial scene rendering (e.g., the image data buffer 106) to a realistic image (e.g., rerendered image 110). In other words, the neural rerendering network 108 may generate a realistic image (e.g., rerendered image 110) from an initial rough image (e.g., image data buffer 106). The rerendered image 110 may be a realistic rerendering of the image data buffer 106.

The input to the neural rerendering network 108 is the image data buffer 106 (e.g., a G-buffer, deferred-shading framebuffer in which each rendered pixel stores albedo (color), depth, and other attributes), and the outputs of the neural rerendering network 108 are realistic views (e.g., rerendered images 110) under different appearance conditions. As discussed later in the disclosure, the neural rerendering network 108 is trained to learn the transformation from the initial renders (e.g., image data buffers 106) to photo-realistic images (e.g., rerendered images 110) using training data (which is generated by the neural rerendering system 100 as aligned input-output pairs). In some examples, the rerendered image 110 may have a quality (e.g., resolution, detail) that is greater than the quality of the image data buffer 106.

The neural rerendering network 108 may receive appearance code 142 (e.g., an appearance vector having values) that specifies one or more appearance conditions to be included in the rerendered image 110. In some examples, the neural rerendering network 108 receives the appearance code 142 at the bottleneck layer of the neural rerendering network 108. As explained later in the disclosure, an appearance encoder 138 (e.g., a neural network) is trained to encode any appearance condition of the scene, which generates the appearance code 142. In some examples, the appearance code 142 is learned from the input images 102 during the training of the neural rerendering system 100. The appearance code 142 may summarize or represent the weather and lighting conditions together with any factor that might influence the appearance of the scene. In other words, the values of the appearance code 142 may determine the appearance conditions of the rerendered image 110, and the adjustment of the values of the appearance code 142 can change one or more appearance conditions of the scene.

If the appearance code 142 indicates one or more first appearance conditions (e.g., snowy, cloudy), the neural rerendering network 108 transforms the image data buffer 106 to the rerendered image 110 such that the rerendered image 110 includes the one or more first appearance conditions (e.g., snowy, cloudy). Then, the appearance code 142 may be modified to indicate one or more second appearance conditions (e.g., sunny), and the neural rerendering network 108 transforms the image data buffer 106 to the rerendered image 110 such that the rerendered image 110 includes the one or more second appearance conditions (e.g., sunny). Since the appearance code 142 was trained to capture a plurality of appearance conditions of the scene (e.g., any or all appearance conditions), the rerendered image 110 may be generated according to any appearance condition (or any viewpoint) by adjusting the values of the appearance code 142. The appearance modeling discussed herein may avoid (or reduce) producing rerenderings having a single (or average) appearance of the scene, thereby making the rerendered images 110 more realistic and consistent. Further, by using the appearance code 142 as an input to the neural rerendering network 108 (at the bottleneck layer), the neural rerendering network 108 may produce different outputs (e.g., the scene from a certain point of view under a plurality of different appearance conditions) for a given input.

In some examples, a semantic label map 124 is used as another input to the neural rerendering network 108 to allow the neural rerendering network 108 to predict the location of transient objects 125. For example, the semantic label map 124 may identify one or more categories of information (e.g., on a pixel-by-pixel basis). In some examples, the semantic label map 124 indicates multiple transient objects 125 of different categories (e.g., a car and two pedestrians). The semantic label map 124 may include data that identifies the location of one or more transient objects 125. To prevent (or reduce) the neural rerendering network 108 from hallucinating the location of transient objects 125 on the original photos (e.g., the input images 102), the neural rerendering system 100 is constructed such that the semantic label map 124 is used as another input to the neural rerendering network 108. In some examples, the semantic label map 124 is derived from the input image 102. In some examples, the semantic label map 124 is derived from portions of an image data buffer 106. In some examples, the semantic label map 124 is included as part of the image data buffer 106.

The neural rerendering network 108 is a neural network (e.g., a deep neural network). In some examples, the neural rerendering network 108 is an image translation network defining a neural network, where the image translation network is modified to receive the appearance code 142 at the bottleneck layer of the neural rerendering network 108 and receive the semantic label map 124 as another input to the neural rerendering network 108. In some examples, the appearance code 142 (received by the neural rerendering network 108) corresponds to the appearance code 142 of the original photo (e.g., the input image 102) having the same viewpoint. For example, if the original photo is sunny, the rerendered image 110 is sunny. In some examples, the appearance code 142 (received by the neural rerendering network 108) corresponds to an appearance condition that is different from the appearance condition of an input image 102 having a viewpoint that is the same as the viewpoint of the rerendered image 110. For example, the original photo may be sunny, but the appearance code 142 (received by the neural rerendering network 108) specifies the appearance condition as cloudy.

The neural rerendering network 108 may be an interconnected group of nodes, each node representing an artificial neuron. The nodes are connected to each other in layers, with the output of one layer becoming the input of a next layer. Neural networks transform an input (e.g., the image data buffer 106), received by the input layer, transform it through a series of hidden layers, and produce an output (e.g., the rerendered image 110) via the output layer. Each layer is made up of a subset of the set of nodes. The nodes in hidden layers are fully connected to all nodes in the previous layer and provide their output to all nodes in the next layer. The nodes in a single layer function independently of each other (i.e., do not share connections). Nodes in the output provide the transformed input to the requesting process.

In some examples, the neural network is a convolutional neural network, which is a neural network that is not fully connected. Convolutional neural networks therefore have less complexity than fully connected neural networks. Further, the same set of learned weight parameters can be applied to the neighborhoods of nodes in the 2D grid of the network layer, as in a 2D convolution operation. Convolutional neural networks can also make use of pooling or max-pooling to reduce the dimensionality (and hence complexity) of the data that flows through the neural network and thus this can reduce the level of computation required. This makes computation of the output in a convolutional neural network faster than in neural networks. In some examples, the neural rerendering network 108 includes a symmetric encoder-decoder with skip connections. In some examples, the neural rerendering network 108 includes a multiscale-patch GAN discriminator with three scales and employs a LSGAN loss. As a reconstruction loss, the neural rerendering network 108 uses the perceptual loss evaluated at $conv_{i,2}$ for $i \in [1,5]$ of VGG.

Figure 2:
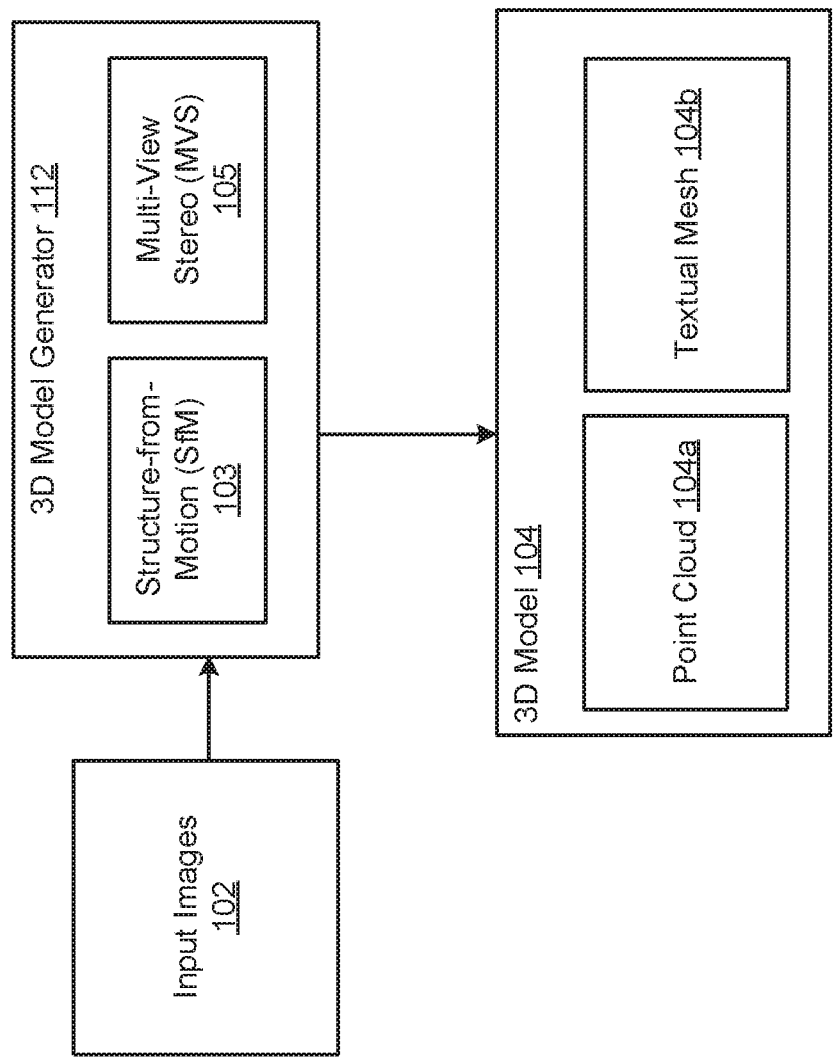
FIG. 2 illustrates a 3D model generator configured to generate a 3D model according to an aspect.

FIG. 2 illustrates a 3D model generator 112 that generates the 3D model 104 using the input images 102. In some examples, the 3D model generator generates the 3D model 104 based on structure-from-motion (SfM) 103 and/or multi-view stereo (MVS) 105. SfM 103 may be a photogrammetric range imaging technique for estimating 3D structures from 2D image sequences that may be coupled with local motion signals. In some examples, SfM 103 is used to structure images, e.g., estimates photo location, its orientation, and camera parameters. In some examples, MVS 105 obtains the location and orientation information from SfM 103 and creates a 3D model 104 (e.g., a 3D dense point cloud). In some examples, the 3D model 104 is a point cloud 104*a* (e.g., a 3D dense point cloud). A point cloud 104*a* may be a set of data points in space representing a 3D structure of the scene. These points represent the X, Y, and Z geometric coordinates of a single point on an underlying sampled surface. In some examples, the 3D model 104 is a textual mesh 104*b*. A textual mesh 104*b* is a 3D mesh that includes polygons, which use reference points in X, Y, and Z axes to define shapes with height, width, and depth.

Figure 3:
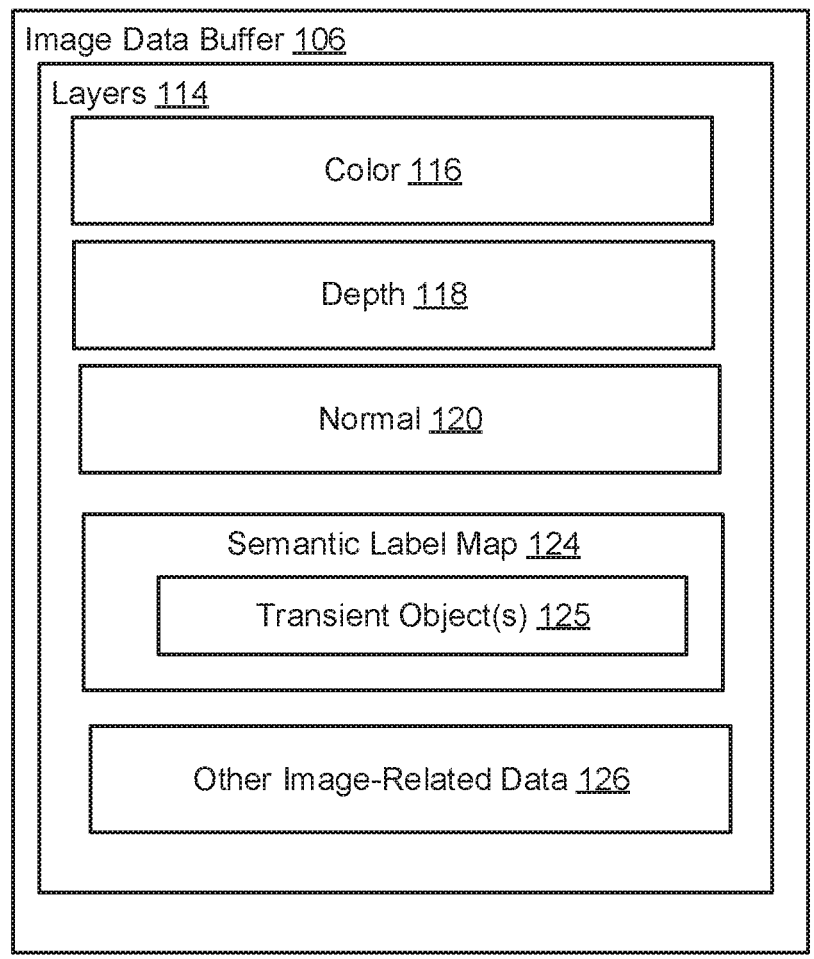
FIG. 3 illustrates an example of an image data buffer according to an aspect.

FIG. 3 illustrates an example of an image data buffer 106. The image data buffer 106 may include a plurality of layers 114. Each layer 114 may include a different category of image data pertaining to a particular viewpoint. The layers 114 may include color (e.g., red green blue (RGB)) 116, depth 118, normal 120, the semantic label map 124, and/or other image-related data 126. The color 116 (or referred to as a color layer) may be an RGB diffuse color vector also known as albedo. The depth 118 (or referred to as a depth layer) is a depth map having depth values for the objects. The normal 120 (or referred to as a normal layer) is a 3D normal vector for determining a surface's orientation (e.g., the gradient of its depth in the 2D domain of the image data buffer 106). The other image-related data 126 may include a specular intensity float, light source position and color vectors, and a camera's position vector.

In some examples, the semantic label map 124 may include data that identifies the location of one or more transient objects 125. However, the semantic label map 124 may be used to identify the type (or classification) of any type of data (e.g., ground, sky, building, etc.). Although the description discussed herein refers to the semantic label map 124 as identifying transient objects 125 (or different categories of transient objects 125), the semantic label map 124 may classify other types of information, where the neural rerendering network 108 can be instructed to omit any type of object (besides or in addition to transient objects 125). A transient object 125 may be image data or an image segment that is determined as likely to move (e.g., people, cars, objects not normally in the scene, etc.).

As explained later in the disclosure, in some examples, the semantic label map 124 may be used to generate a rerendered image 110 that does not include transient objects 125 or certain categories of transient objects 125 like people. Further, conditioning the neural rerendering network 108 on the semantic label maps 124 during training may help to reduce the hallucination of the location of the transient object 125. Generally, the semantic label map 124 may indicate a partitioning of a digital image into multiple segments, which is used to locate objects and boundaries. In some examples, the semantic label map 124 may specify labels to pixels (e.g., each label corresponding to a different category), where the generation of a semantic label map 124 may involve assigning a label to every pixel in an image such that pixels with the same label share certain characteristics. In some examples, the semantic label map 124 is a semantic mask indicating the locations of transient objects 125. In some examples, the semantic label map 124 is a segmentation or semantic segmentation that identifies the locations of transient objects 125. In some examples, the semantic label map 124 is a segmentation map that identifies the locations of transient objects 125. In some examples, the semantic label map 124 is included as part of the image data buffer 106. In some examples, the semantic label map 124 is separate from the image data buffer 106. In some examples, the semantic label map 124 is generated from an input image 102 (or ground truth image 102a) using a semantic segmentation network 130 (as discussed with reference to FIG. 4). In some examples, the semantic label map 124 is generated from an image data buffer 106 using an image-to-image translation network 132 (as discussed with reference to FIG. 5).

FIG. 4 illustrates an example of the neural rerendering system 100 that includes a transient object detector 128 according to an aspect. In some examples, during the training of the neural rerendering network 108, the transient object detector 128 is configured to generate the semantic label map 124 from the corresponding input image 102 (or ground truth image 102a). In some examples, the transient object detector 128 includes a semantic segmentation network 130 (e.g., a neural network). During the training of the neural rerendering network 108, the semantic segmentation network 130 is configured to receive the input image 102 (or ground truth image 102a) and generate the semantic label map 124. In some examples, the semantic label map 124 is included as part of an image data buffer 106 that corresponds to the input image 102. Then, when generating a rerendered image 110 from that image data buffer 106, the semantic label map 124 can be used to omit transient objects 125.

FIG. 5 illustrates an example of the neural rerendering system 100 having a transient object detector 128 according to another aspect. In some examples, after training the neural rerendering network 108 (e.g., during testing or runtime), a novel viewpoint may be generated in which (as discussed above) an image data buffer 106 having that novel viewpoint is generated from the 3D model 104. However, at this point, the image data buffer 106 may not include the semantic label map 124. In some examples, the transient object detector 128 is configured to generate the semantic label map 124 from portions of the image data buffer 106. In some examples, the transient object detector 128 uses the layers of the color 116 and the depth 118 of the image data buffer 106 to generate the semantic label map 124. The transient object detector 128 includes an image-to-image translation network 132 (e.g., a neural network). The image-to-image translation network 132 is configured to receive the color 116 and the depth 118 of the image data buffer 106 and generate the semantic label map 124. In some examples, the semantic label map 124 are then included as part of the image data buffer 106. Then, when generating a rerendered image 110 from that image data buffer 106, the semantic label map 124 can be used to omit transient objects 125.

Figure 6:
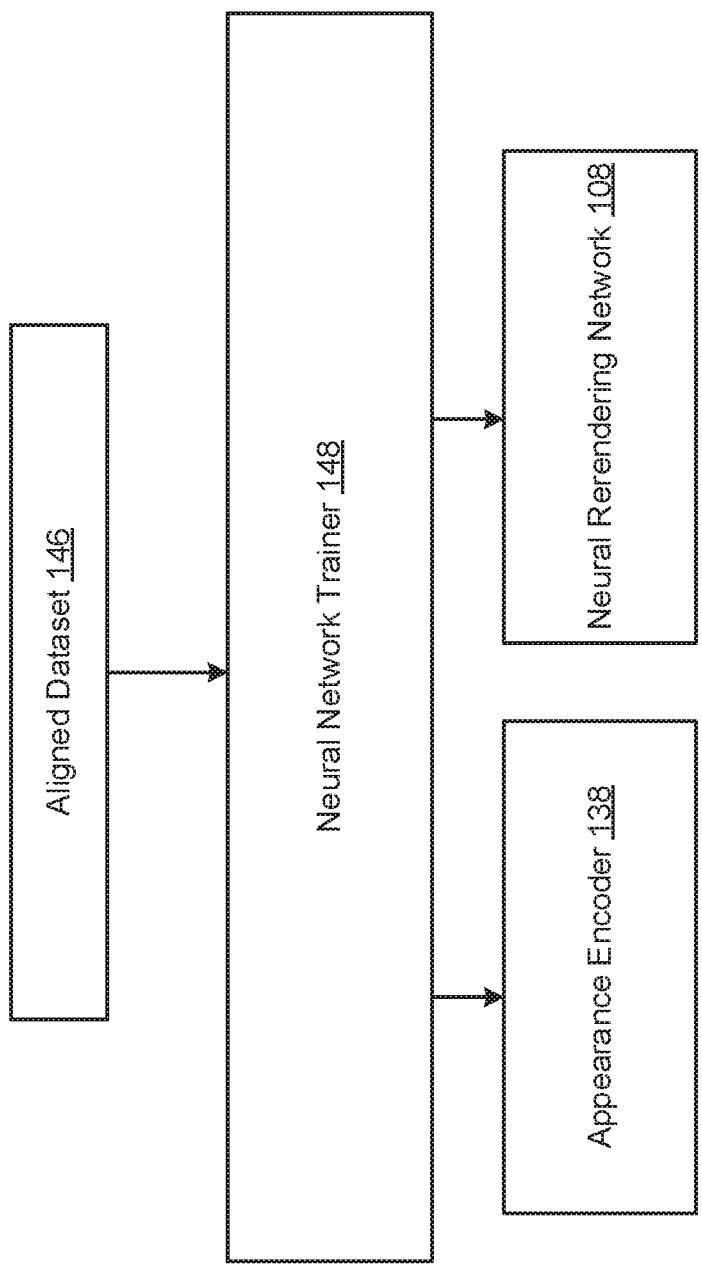
FIG. 6 illustrates a neural network trainer configured to train an appearance encoder and a neural rerendering network using an aligned dataset according to an aspect.

FIG. 6 illustrates an example of the neural rerendering system 100 having a neural network trainer 148 according to an aspect. The neural network trainer 148 is configured to train the network by generating an aligned dataset 146, using the recovered viewpoint parameters of each input image 102 to render an image data buffer 106 of the scene from the same view, e.g., with pixel wise alignment. The aligned dataset 146 is considered the training data for the neural rerendering system 100. As further explained later in the disclosure, the aligned dataset 146 includes a plurality of pairs of images, where each pair includes an input image 102 and an image data buffer 106 rendered from the 3D model 104. With respect to a particular pair, the input image 102 and the image data buffer 106 are from the same viewpoint, and the input image 102 is pixel aligned with the image data buffer 106. The neural network trainer 148 is configured to train the appearance encoder 138 and the neural rerendering network 108 using the aligned dataset 146, where the aligned dataset 146 is the training data for the appearance encoder 138 and the neural rerendering network 108.

Figure 7:
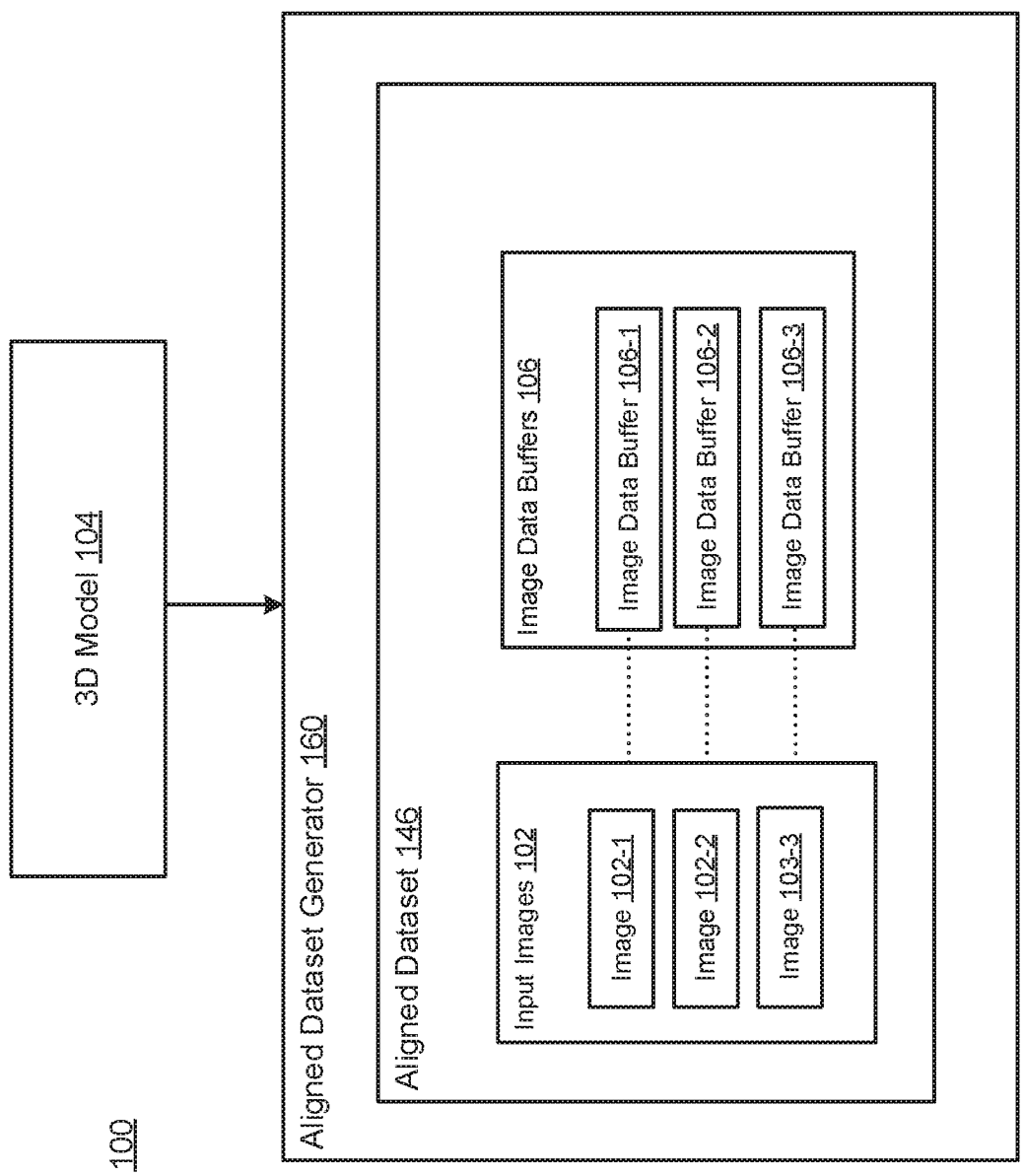
FIG. 7 illustrates an aligned dataset generator configured to generate an aligned dataset to be used as training data according to an aspect.
Figure 8:
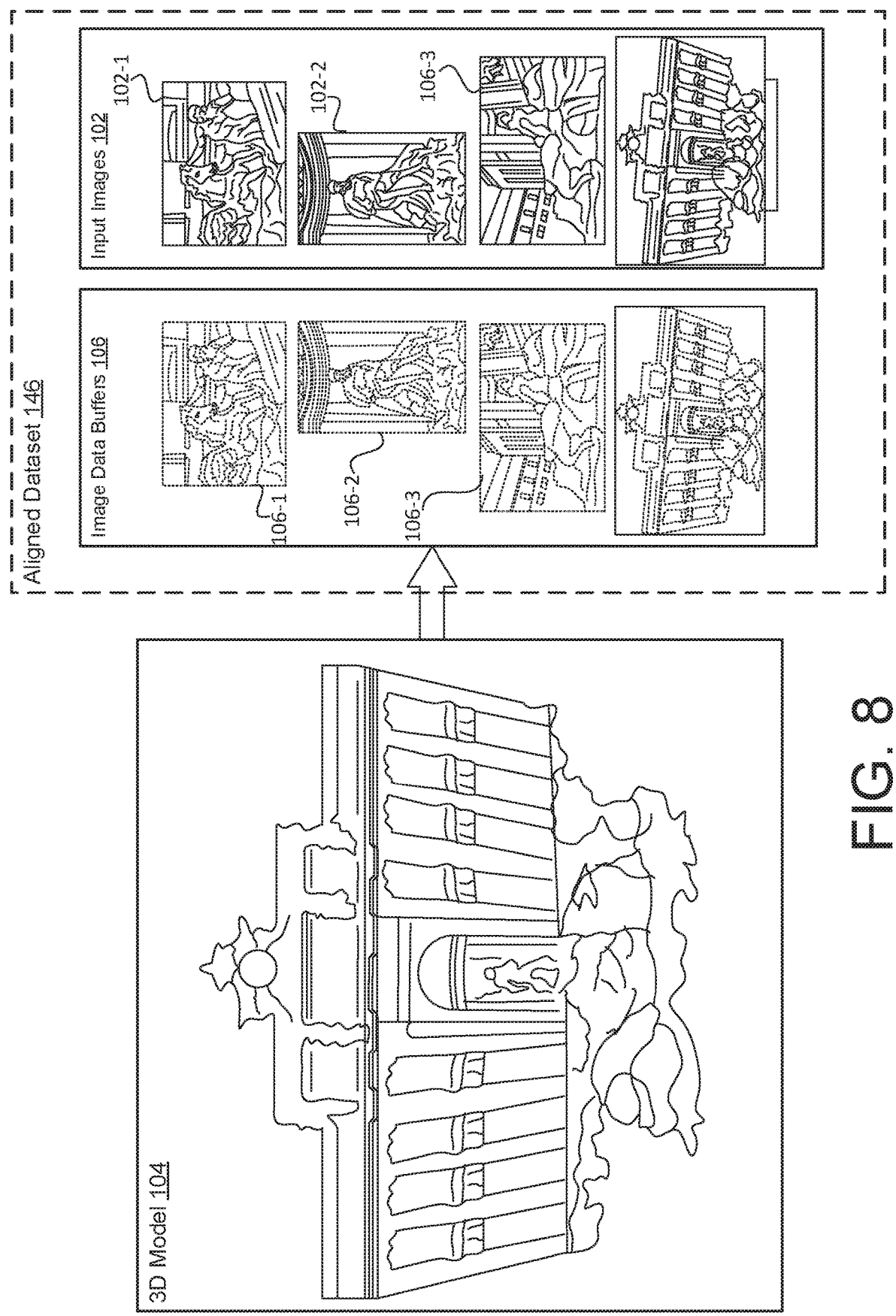
FIG. 8 illustrates an example of a 3D model and an aligned dataset according to an aspect.

FIG. 7 illustrates an example of the neural rerendering system 100 having an aligned dataset generator 160 configured to generate the aligned dataset 146 using the 3D model 104. FIG. 8 illustrates a perspective of the 3D model 104 and the aligned dataset 146. The aligned dataset 146 includes rendered images and real images by rendering the 3D model 104 from the viewpoint $v_i$ of each input image 102 ($I_i$), where $v_i$ includes camera intrinsics and extrinsics recovered via the SfM 103. The aligned dataset generator 160 may generate an image data buffer 106 ($B_i$) for each image, which may contain color 116 (e.g., albedo), normal 120, depth 118 and any other image-related data 126. In some examples, the image data buffer 106 only uses color 116 and depth 118, and the 3D model 104 is rendered by using point splatting with a z-buffer with a radius of one pixel.

Referring to FIGS. 7 and 8, the aligned dataset 146 includes a first group having the input images 102 and a second group having the image data buffers 106. The input images 102 were used to construct the 3D model 104. For each input image 102 in the photo collection 101, the aligned dataset generator 160 renders the 3D model 104 from the estimated viewpoint for that image to obtain the aligned dataset 146.

In the example of FIGS. 7-8, the input images 102 include an image 102-1, an image 102-2, and an image 103-3, and the image data buffers 106 includes an image data buffer 106-1, an image data buffer 106-2, and an image data buffer 106-3. The image 102-1 and the image data buffer 106-1 is considered a first pair, where the image data buffer 106-1 is from the same viewpoint as the image 102-1, and the image data buffer 106-1 is pixel aligned with the image 102-1. For example, the aligned dataset generator 160 is configured to receive the image 102-1 (having a particular viewpoint) and generate the image data buffer 106-1 from the 3D model 104 that has the same viewpoint as the image 102-1. The image 102-2 and the image data buffer 106-2 is considered a second pair, where the image data buffer 106-2 is from the same viewpoint as the image 102-2, and the image data buffer 106-2 is pixel aligned with the image 102-2. For example, the aligned dataset generator 160 is configured to receive the image 102-2 (having a particular viewpoint) and generate the image data buffer 106-2 from the 3D model 104 that has the same viewpoint as the image 102-2. The image 102-3 and the image data buffer 106-3 is considered a third pair, where the image data buffer 106-3 is from the same viewpoint as the image 102-3, and the image data buffer 106-3 is pixel aligned with the image 102-3. For example, the aligned dataset generator 160 is configured to receive the image 102-3 (having a particular viewpoint) and generate the image data buffer 106-3 from the 3D model 104 that has the same viewpoint as the image 102-3.

Figure 9:
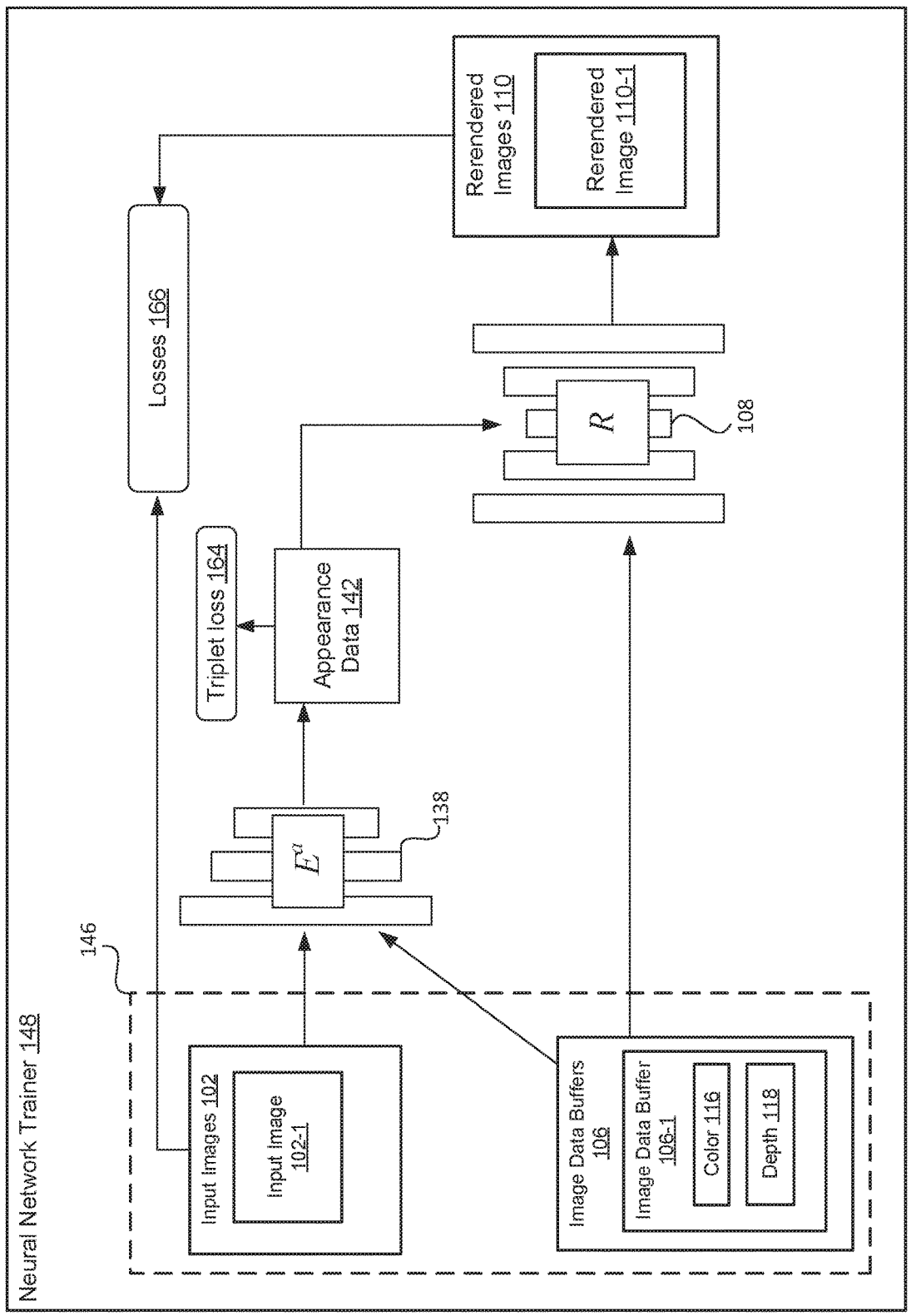
FIG. 9 illustrates an example of a training architecture for the neural rerendering system according to an aspect.

FIG. 9 illustrates an example of the overall training architecture according to an aspect. The neural network trainer 148 is configured to train the appearance encoder 138 (using triplet loss 164) and the neural rerendering network 108 (using losses 166) based on the aligned dataset 146, which includes the pairs of input images 102 and image data buffers 106. The pairs may include a first pair having an input image 102-1 and an image data buffer 106-1. The first pair used as an example, where the number of pairs may be in the hundreds or thousands.

According to an aspect of the neural network training, the neural network trainer 148 provides the image data buffer 106-1 to the neural rerendering network 108 and transforms the image data buffer 106-1 into a rerendered image 110-1 from the same viewpoint as the image data buffer 106-1. In some examples, the neural rerendering network 108 receives the color 116 and the depth 118 of the image data buffer 106-1 and transforms the color 116 and the depth 118 to the rerendered image 110-1. In some examples, the neural rerendering network 108 is configured to execute image-to-image translation. Then, the neural network trainer 148 is configured to compute losses 166 using the rerendered image 110-1 and the input image 102-1. In some examples, the losses 166 include perceptual losses and/or adversarial losses. In some examples, the losses 166 include generative adversarial network (GAN) losses and VGG (perceptual) losses. In some examples, the input image 102-1 is the original photo, and the original photo is compared to the one generated by the neural rerendering network 108, and the difference between the two may be reflected by the losses 166. In other words, the image data buffer 106-1 is fed to the neural rerendering network 108 and the input image 102-1 is used to train the neural rerendering network 108 (e.g., teach the neural rerendering network 108 that the rerendered image 110-1 should look like the input image 102-1).

As indicated above, the same viewpoint can appear under different weather conditions, different lighting, and/or different times of the day, etc. If the neural rerendering system 100 did not include the appearance encoder 138, in some examples, the neural rerendering network 108 may learn the average appearance of the scene and/or the appearance for each viewpoint in the training data. However, in order to overcome this technical challenge, the neural rerendering system 100 implements the neural rerendering as a multi-model image synthesis task, where the neural rerendering network 108 is conditioned on the desired appearance.

For example, the neural network trainer 148 trains the appearance encoder 138 to learn to encode the appearance of an input image 102 as appearance code 142, where the appearance code 142 is provided as a separate input (e.g., at the bottleneck layer) into the neural rerendering network 108. Further, the appearance encoder 138 is trained using triplet loss 164, which is further explained later in the disclosure. The appearance encoder 138 may be a neural network. In some examples, the number of layers of the appearance encoder 138 is less than the number of layers included in the neural rerendering network 108 (e.g., the appearance encoder 138 is a neural network that is smaller than the neural rerendering network 108).

The neural network trainer 148 may train the appearance code 142 in such a way that images with similar appearance have similar code. In some examples, the appearance code 142 includes latent appearance code (or a latent appearance vector defining values or coefficients). The appearance encoder 138 receives the input images 102 and the image data buffers 106 as inputs and computes the appearance code 142, which captures variations in the input images 102 (e.g., output domain $I_i$) that may be inferred from the image data buffers 106 (e.g., input domain BO. By having the appearance encoder 138 observe the image data buffers 106, the appearance encoder 138 may learn relatively complex appearance models by correlating the lighting in the input images 102 with the scene geometry in the image data buffers 106. The appearance code 142 may summarize or represent the weather and lighting conditions together with any factor that might influence the appearance of the scene. The appearance code 142 generally includes information about the appearance such as time of day, whether it's sunny or cloudy, etc. Then, the neural rerendering network 108 generates a rerendered image 110 conditioned on the viewpoint of the corresponding image data buffer 106 and the appearance code 142.

Figure 10:
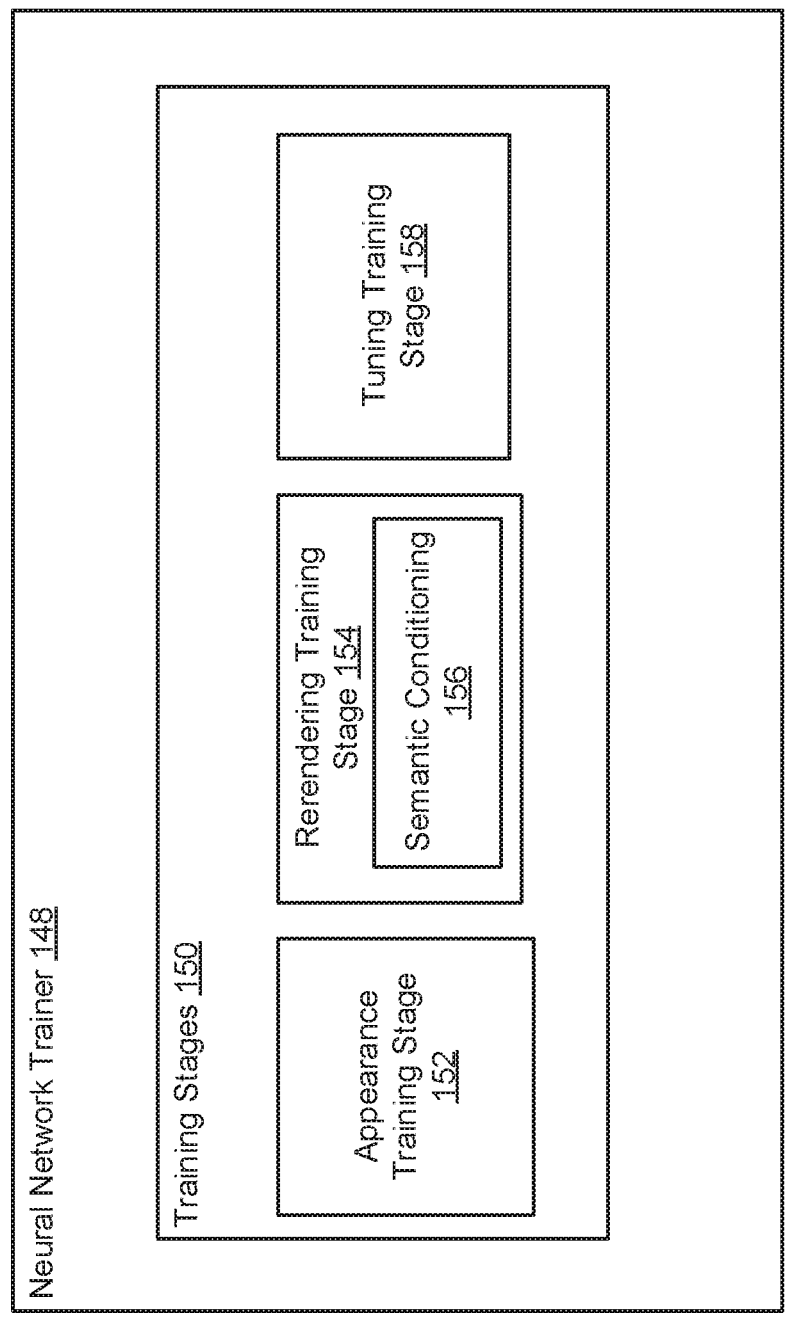
FIG. 10 illustrates an example of a neural network trainer configured to execute a plurality of training stages according to an aspect.

FIG. 10 illustrates an example of the neural network trainer 148 configured to execute staged training operations according to an aspect. In some examples, the neural network trainer 148 uses the aligned dataset 146 to train the appearance encoder 138 and the neural rerendering network 108 according to a plurality of training stages 150. In some examples, the training stages 150 are sequentially executed by the neural network trainer 148.

In some examples, the training stages 150 includes an appearance training stage 152 that trains the appearance encoder 138 to estimate an embedding space for the appearance conditions of the scene, a rerendering training stage 154 that trains the neural rerendering network 108 to transfer the initial renderings (e.g., the image data buffers 106) to the realistic images (e.g., the rerendered images 110), and a tuning training stage 158 that trains (collectively) the appearance encoder 138 and the neural rerendering network 108. In some examples, instead of training the appearance encoder 138 and the neural rerendering network 108 jointly, the neural network trainer 148 may execute a staged training process that initially trains the appearance encoder 138 using a proxy style-based loss technique (which captures the style of an image) during the appearance training stage 152.

Then, during the rerendering training stage 154, the neural network trainer 148 trains the neural rerendering network 108 with fixed appearance embeddings from the already-trained appearance encoder 138. In some examples, during the rerendering training stage 154, the neural network trainer 148 performs semantic conditioning 156 on the neural rerendering network 108 so that the neural rerendering network 108 can learn to ignore transient objects 125 rather than trying to hallucinate their locations. The semantic conditioning 156 may refer to conditioning the neural rerendering network 108 on the semantic label maps 124. For example, transient objects 125 (e.g., pedestrians and cars) are handled by conditioning the neural rerendering network 108 on the expected semantic label map 124 of the output image, so that the neural rerendering network 108 can learn to ignore these transient objects 125 rather than trying to hallucinate their locations. The generation and inclusion of the semantic label map 124 may also be effective at discarding small or thin scene features (e.g., lampposts) whose geometry cannot be robustly reconstructed, yet are easily identified using image segmentation methods. Conditioning the neural rerendering network 108 on the semantic label maps 124 also enables the rendering of scenes free of people if desired. This may discourage the neural rerendering network 108 from encoding variations caused by the location of transient objects 125 in the appearance code 142 (e.g., the appearance vector), or associating such transient objects 125 with specific viewpoints.

A separate benefit of the semantic mapping is that it allows the neural rerendering network 108 to reason about static objects in the scene not captured in the 3D reconstruction, such as lampposts in San Marco Square. This prevents the neural rerendering network 108 from haphazardly introducing such objects, and instead lets them appear where they are detected in the semantic label map 124, which may be a significantly simpler task (e.g., in terms of processing power and memory). In addition, by adding the semantic label map 124 to the image data buffer 106, the appearance encoder 138 may be permitted to reason about semantic categories like sky or ground when computing the appearance code 142. Next, during the tuning training stage 158, the neural network trainer 148 jointly trains (e.g., jointly fine tunes) the appearance encoder 138 and the neural rerendering network 108. The staged training may improve the capture of scene appearance and scene modeling.

Figure 11:
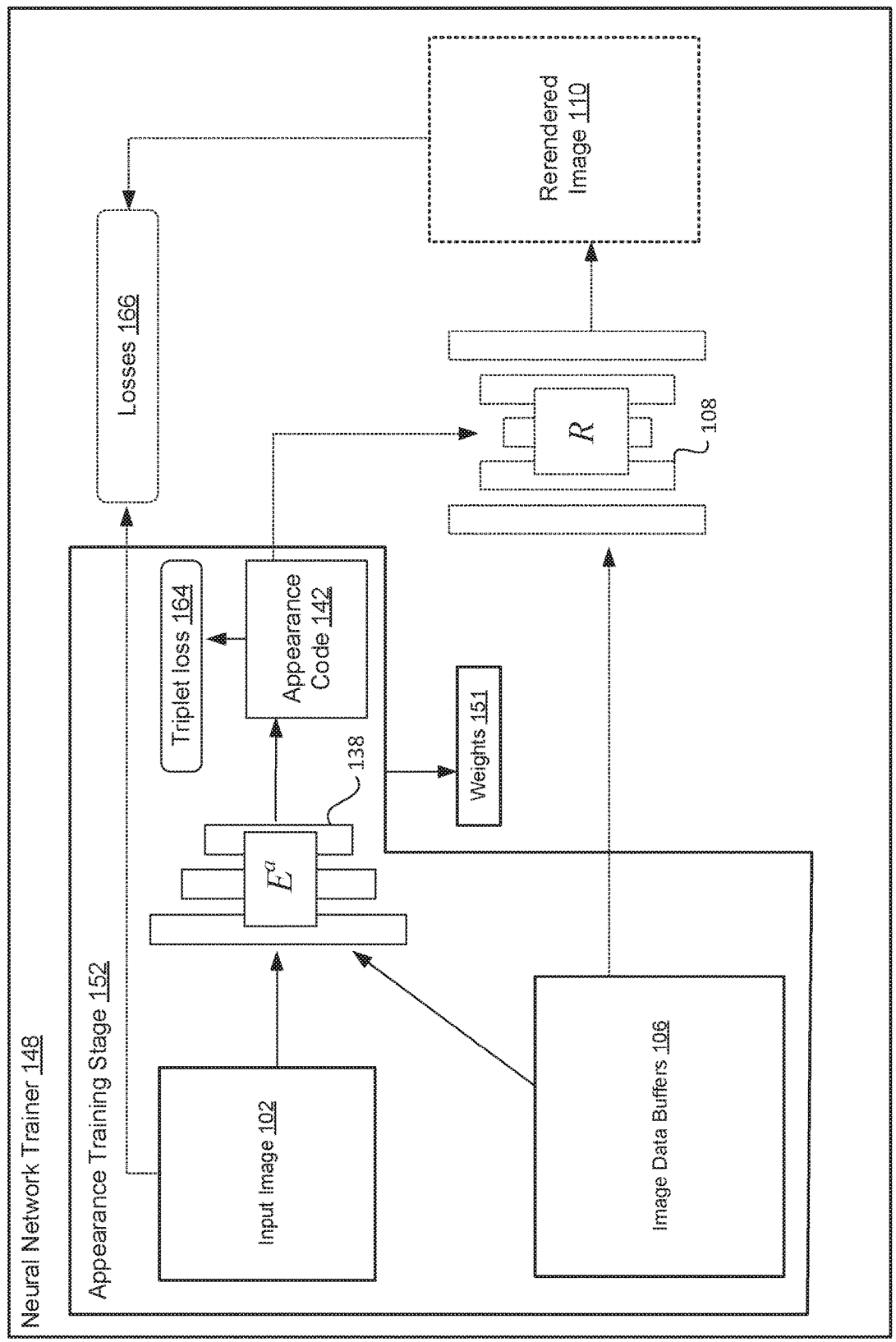
FIG. 11 illustrates an example of a training architecture for the neural rerendering system according to an appearance training stage according to an aspect.

FIG. 11 illustrates the appearance training stage 152 of the neural network trainer 148 according to an aspect. In the appearance training stage 152, the neural rerendering network 108 is deactivated, where only the appearance encoder 138 is trained using the aligned dataset 146 of the input images 102 and the image data buffers 106. In other words, during the appearance training stage 152, the appearance encoder 138 is isolated from the rerendering network 108. The training of the appearance encoder 138 generates the weights 151 for the appearance encoder 138.

During the appearance training stage 152, the appearance encoder 138 is configured to receive the pairs of the input images 102 and the image data buffers and compute the appearance code 142. In some examples, the appearance code 142 is a latent appearance vector $z_i^a$ that captures variations in the output domain $I_i$ (e.g., the input images 102) that cannot be inferred from the input domain $B_i$ (e.g., image data buffers 106). The appearance encoder 138 is configured to compute the latent appearance vector (e.g., the appearance code 142) as $z_i^a = E^a(I_i, B_i)$ where $E^a$ is the appearance encoder 138 that takes as input both the input image 102 ($I_i$) and the image data buffer ($B_i$). In some examples, the appearance encoder 138 is configured to learn an appearance model by correlating the lighting in the input image 102 ($I_i$) with scene geometry in the image data buffer ($B_i$). For example, to compute the latent appearance vector (e.g., the appearance code 142), the neural network trainer 148 trains the appearance encoder 138 to produce an appearance image of size (W/2K, H/2K, Z) where K is the number of subsampling operations in the appearance encoder 138, and Z is the dimensionality of the appearance latent vector. This appearance image is averaged over the spatial dimensions, to produce the final latent appearance vector of Z dimensions. In some examples, Z is eight. The latent appearance code is then appended in the feature dimension on the bottleneck layer of the neural rerendering network 108.

Figure 12:
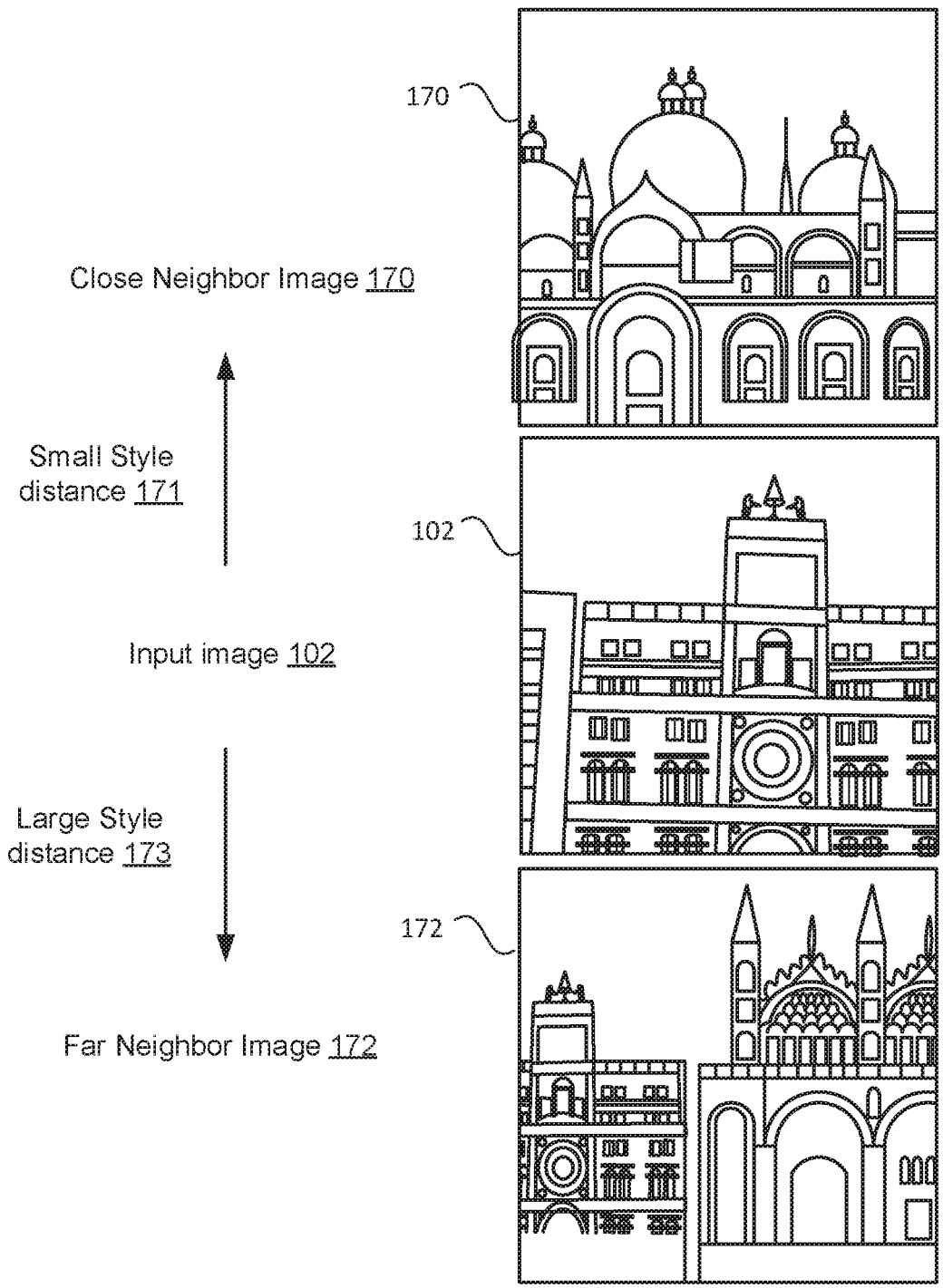
FIG. 12 illustrates an example of computing triplet loss for the training of the appearance encoder according to an aspect.
Figure 13:
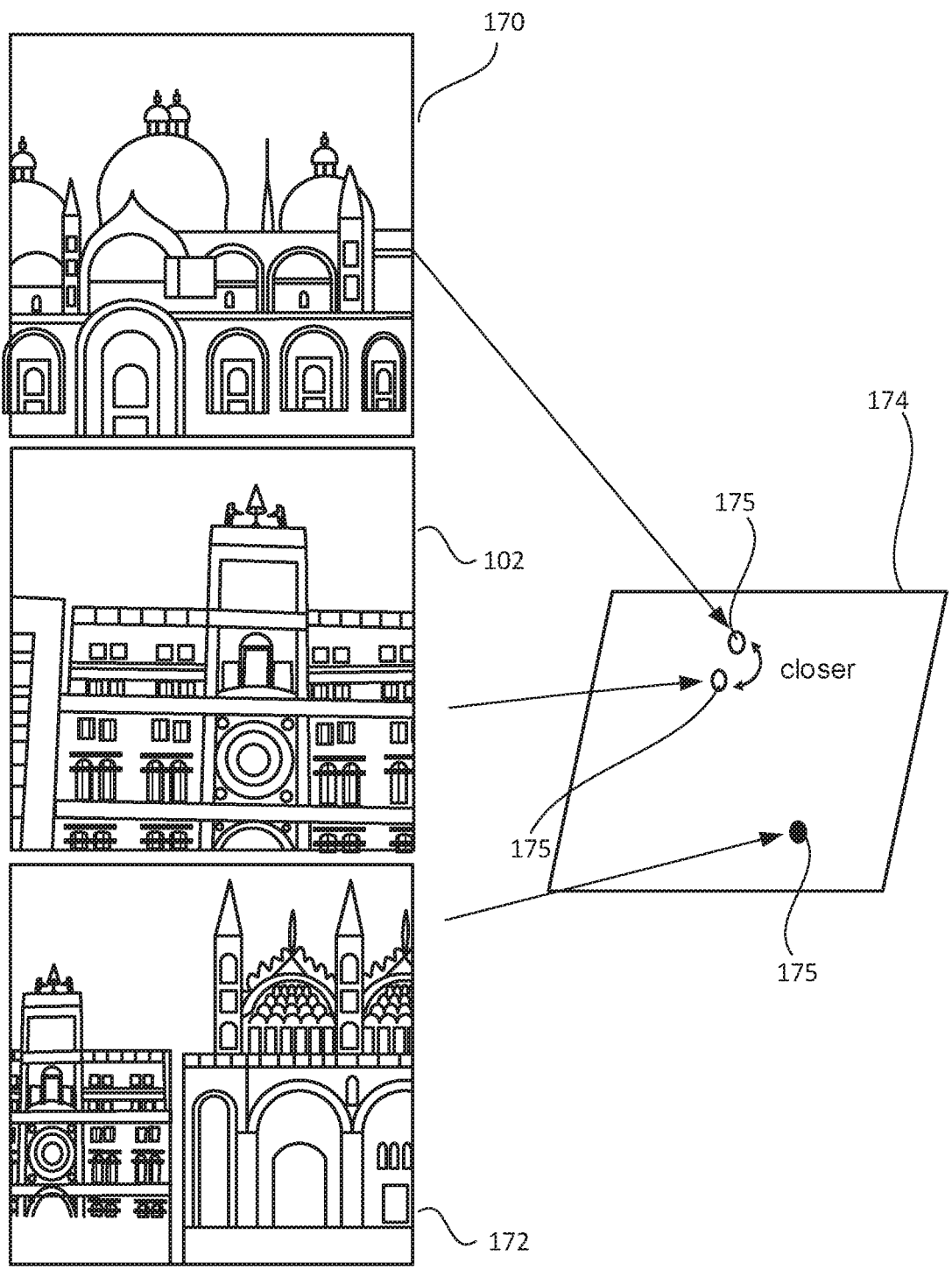
FIG. 13 illustrates an example of computing triplet loss for the training of the appearance encoder according to an aspect.

To train the appearance encoder 138, the neural network trainer 148 is configured to compute the triplet loss 164. FIGS. 12 and 13 illustrate an example of the computation of the triplet loss 164 during the appearance training stage 152. For example, for each input image 102, the neural network trainer 148 samples a close neighbor image 170 and a far neighbor image 172 using style loss as a distance metric, and the neural network trainer 148 trains the appearance encoder 138 to optimize the triplet loss 164 between them. For example, the distance metric between the input image 102 and the close neighbor image 170 is a small style distance 171 (e.g., a relatively small style loss), and the distance metric between the input image 102 and the far neighbor image 172 is a large style distance 173 (e.g., a relatively large style loss).

For example, referring to FIG. 13, the neural network trainer 148 executes a proxy task that optimizes an appearance embedding 175 of the input images 102 into an appearance embedding space 174 using a distance metric (e.g., style loss) between the input images 102. If two images are close under the distance metric (e.g., the input image 102 and the close neighbor image 170), then their appearance embeddings 175 should also be close in the appearance embedding space 174. In some examples, the distance metric may disregard the content or viewpoint of the input images 102 and the image data buffers 106, where the appearance encoder 138 may encode the appearance embeddings 175 that is independent of viewpoint.

To train the appearance embeddings 175, the neural network trainer 148 uses the triplet loss 164, where for each input image 102, the neural network trainer 148 finds the set of k closest and furthest neighbor images given by the style loss, from which the neural network trainer 148 can sample a positive sample $I_p$ (e.g., the close neighbor image 170) and negative sample $I_n$ (e.g., the far neighbor image 172), respectively. The neural network trainer 148 computes the triplet loss 164 as follows:

$$\mathcal{L}(I_i, I_p, I_n) = \Sigma_j \max(\|g_i^j - g_p^j\|^2 - \|g_i^j - g_n^j\|^2 + \alpha, 0) \qquad \text{Eq. (1)}$$

where $g_i^j$ is the Gram matrix of activations at the $j^{th}$ layer of a VGG network of image $I_i$, and $\alpha$ is a separation margin.

Figure 14:
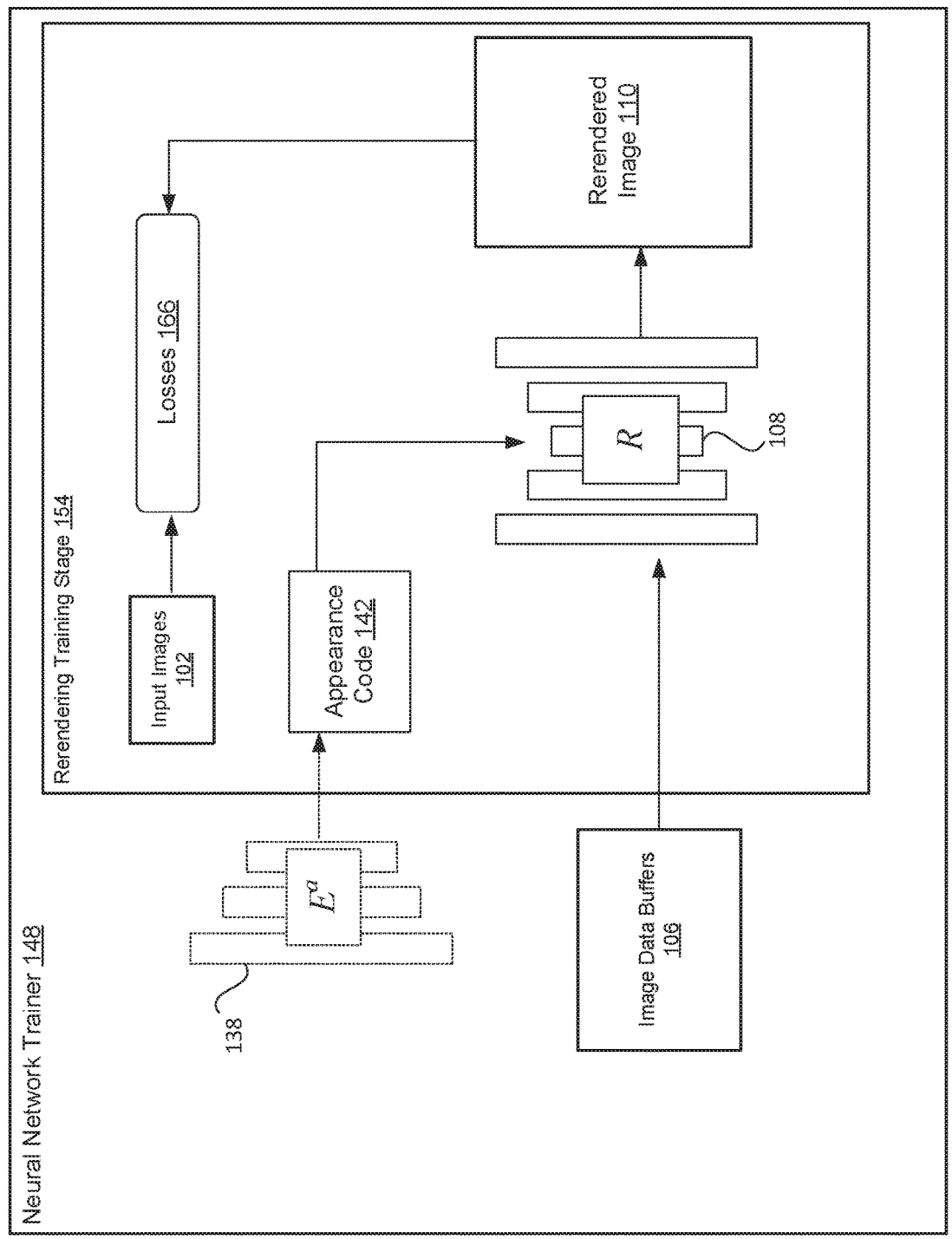
FIG. 14 illustrates an example of a training architecture for the neural rerendering system according to a rerendering training stage according to an aspect.

FIG. 14 illustrates an example of the neural network trainer 148 configured to execute the rerendering training stage 154. After the appearance training stage 152, the neural network trainer 148 is configured to execute the rerendering training stage 154, where the weights 151 of the appearance encoder 138 are kept fixed. During the rerendering training stage 154, the neural network trainer 148 is configured to train the neural rerendering network 108 using the losses 166 (e.g., the GAN and VGG losses).

During the rerendering training stage 154, the neural network trainer 148 provides an image data buffer 106 to the neural rerendering network 108 and transforms the image data buffer 106 into a rerendered image 110 from the same viewpoint as the image data buffer 106. In some examples, the neural rerendering network 108 receives the color 116 and the depth 118 of the image data buffer 106 and transforms the color 116 and the depth 118 to the rerendered image 110. In some examples, the neural rerendering network 108 is configured to execute image-to-image translation. Then, the neural network trainer 148 is configured to compute the losses 166 using the rerendered image 110 and the input image 102. In some examples, the losses 166 include perceptual losses and/or adversarial losses. In some examples, the losses 166 include generative adversarial network (GAN) losses and VGG (perceptual) losses. In some examples, the input image 102 is the original photo, and the original photo is compared to the one generated by the neural rerendering network 108, and the difference between the two may be reflected by the losses 166.

Figure 15:
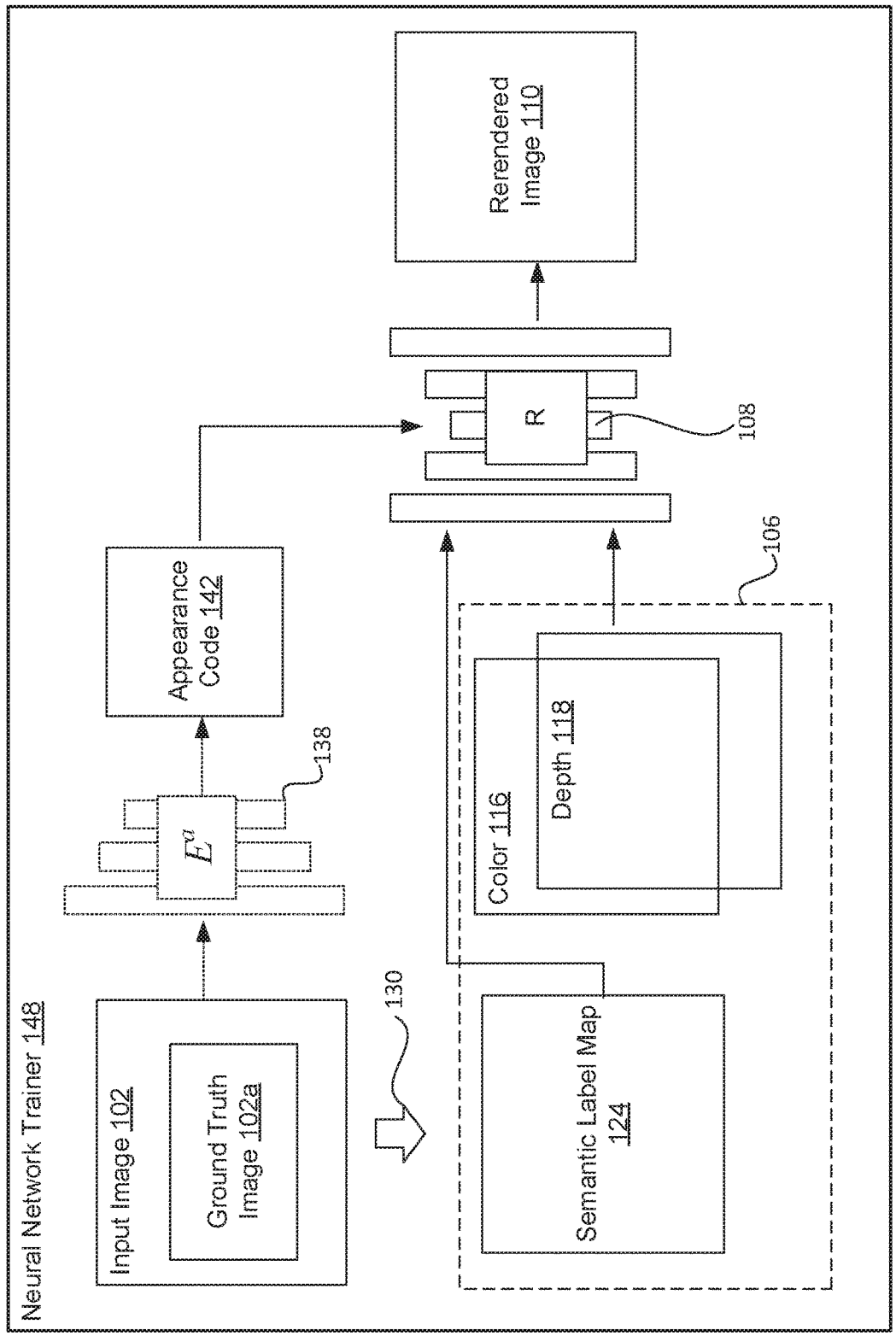
FIG. 15 illustrates an example of generating a semantic label map according to an aspect.

FIG. 15 illustrates an example of a neural network trainer 148 configured to generate a semantic label map 124 during the training of the neural network trainer 148. In addition, as part of the rerendering training stage 154, the neural network trainer 148 is configured to execute semantic conditioning 156 to learn and detect transient objects 125. In some examples, during the rerendering training stage 154, the semantic label map 124 is generated from the input image 102. In some examples, the input image 102 is a ground truth image 102a, where the semantic label map 124 is generated from the ground truth image 102a. During the rerendering training stage 154, the semantic segmentation network 130 is configured to receive the input image 102 (or ground truth image 102a) and generate the semantic label map 124. Then, the semantic label map 124, the color 116, and the depth 118 (which form part of the image data buffer 106) are provided to the neural rerendering network 108.

In some examples, after training the neural rerendering network 108 (e.g., during testing or runtime of the system), a novel viewpoint may be generated in which (as discussed above) an image data buffer 106 having that novel viewpoint is generated from the 3D model 104. However, at this point, the image data buffer 106 may not include the semantic label map 124.

Figure 16:
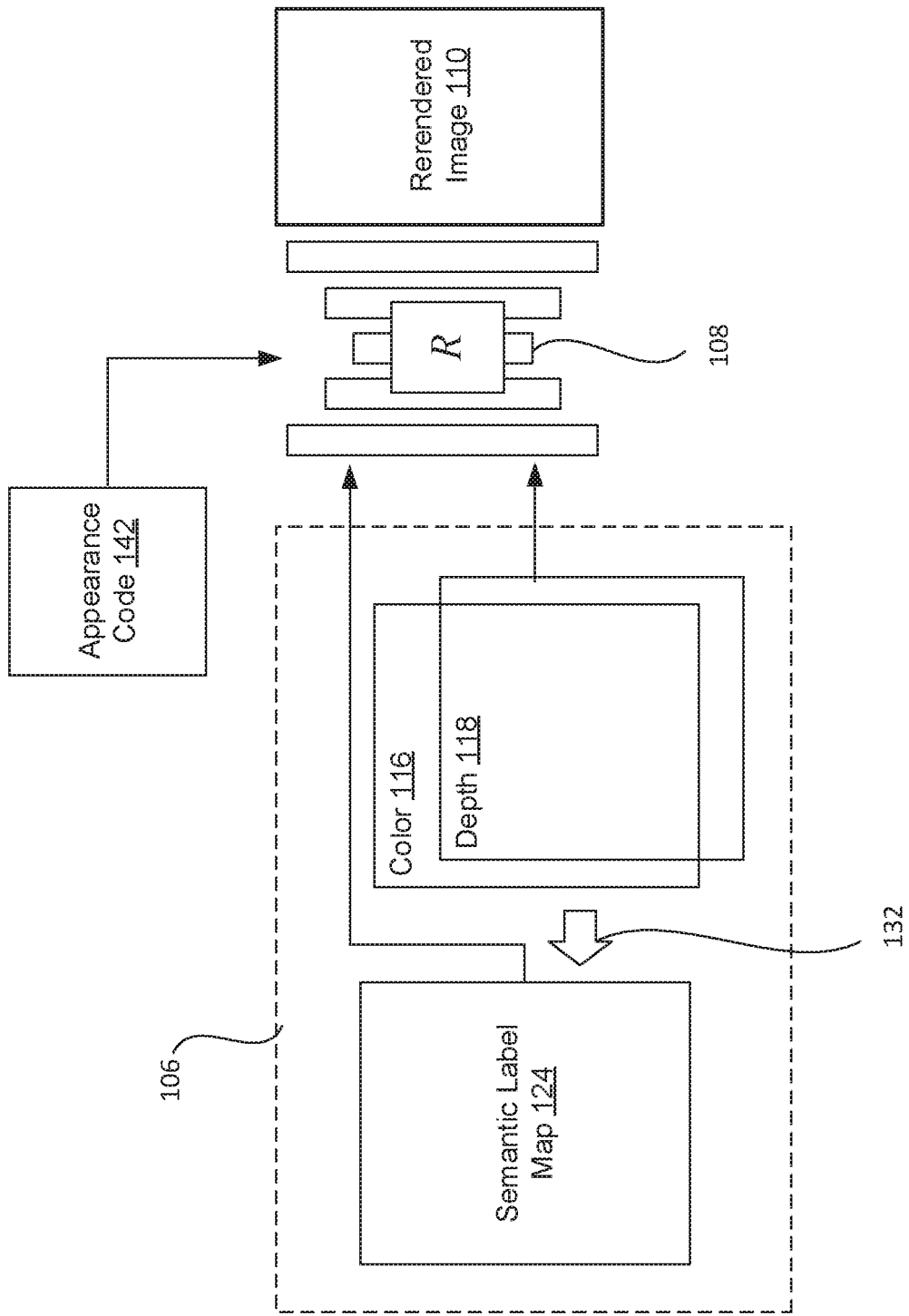
FIG. 16 illustrates an example of generating a semantic label map according to another aspect.

FIG. 16 illustrates an example of generating a semantic label map 124 from a portion of the image data buffer 106 according to an aspect. For example, the image-to-image translation network 132 is configured to generate the semantic label map 124 from the layers of the color 116 and the depth 118 of the image data buffer 106 to generate the semantic label map 124. The transient object detector 128 includes an image-to-image translation network 132. Then, when generating a rerendered image 110 from that image data buffer 106, the semantic label map 124 can be used to omit transient objects 125.

In some examples, in order to rerender virtual camera paths, semantic label map 124 for each frame in the virtual camera path is synthesized. To do so, the image-to-image translation network 132 is trained that takes as input the image data buffer 106 ($B_i$) and estimates a "plausible" semantic labeling $\hat{S}_i$ for that viewpoint given the rendered image data buffer 106 ($B_i$). In some examples, the image-to-image translation network 132 is trained with the same architecture as the neural rerendering network 108 (minus the injected appearance code 142) on samples ($B_i$, $S_i$) from the aligned dataset 146, and the semantic label map 124 of the ground truth images $S_i$ (e.g., the ground truth images 102a) and mask out the loss on pixels labeled as transient as defined by a curated list of transient object categories.

Figure 17:
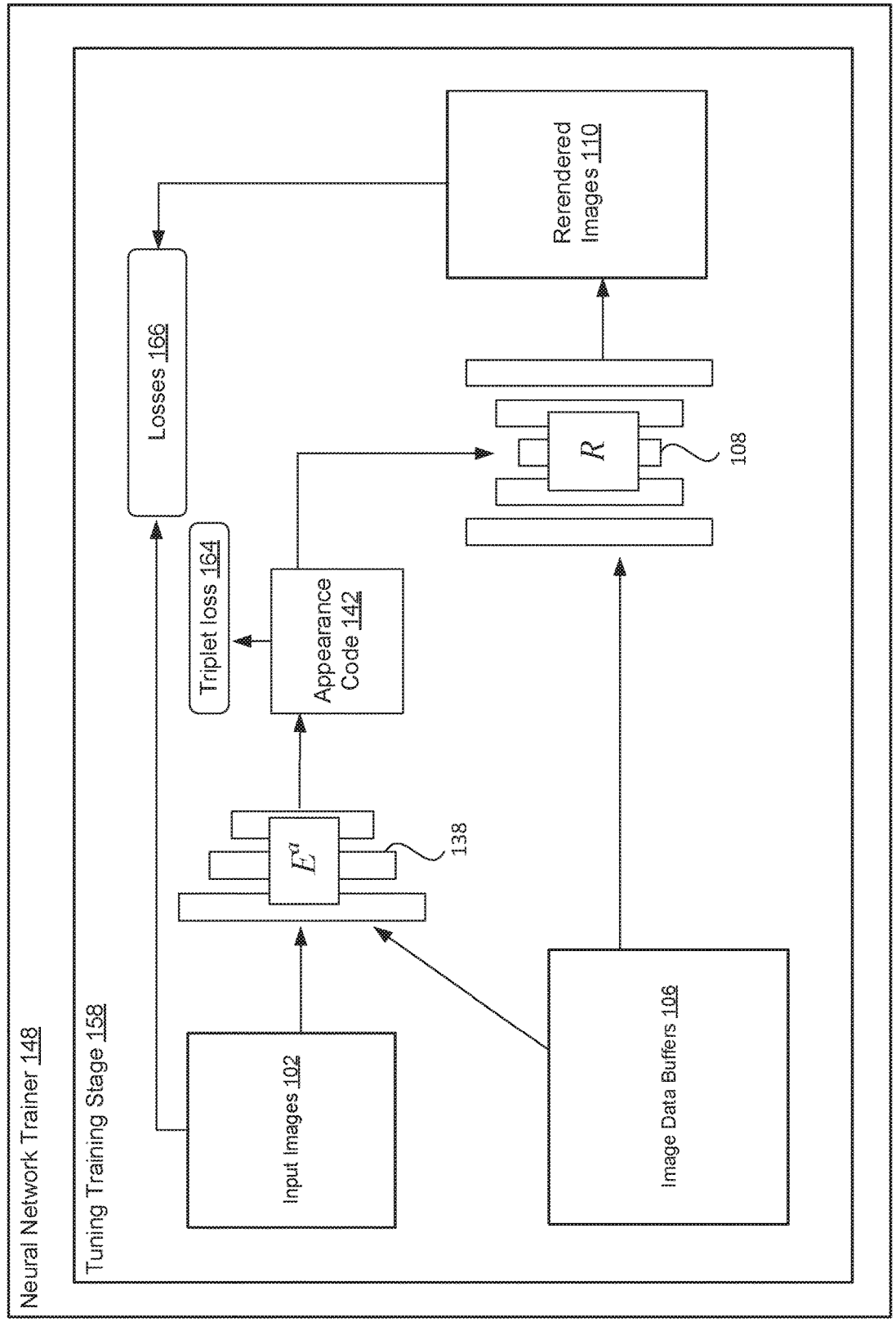
FIG. 17 illustrates a training architecture for the neural rerendering system according to a tuning training stage according to an aspect.

After the rerendering training stage 154, the neural network trainer 148 is configured to execute the tuning training stage 158. FIG. 17 illustrates an example of the neural network trainer 148 configured to execute the tuning training stage 158 according to an aspect. During the tuning training stage 158, the neural network trainer 148 is configured to train both the appearance encoder 138 and the neural rerendering network 108 using the triplet loss 164 and the losses 166 as explained above. This staged approach simplifies and stabilizes the training of the appearance encoder 138, enabling training of a simpler network with fewer regularization terms. In particular, the cycle and cross-cycle consistency losses, the latent vector reconstruction loss, and the KL-divergence loss may be removed.

Figure 18:
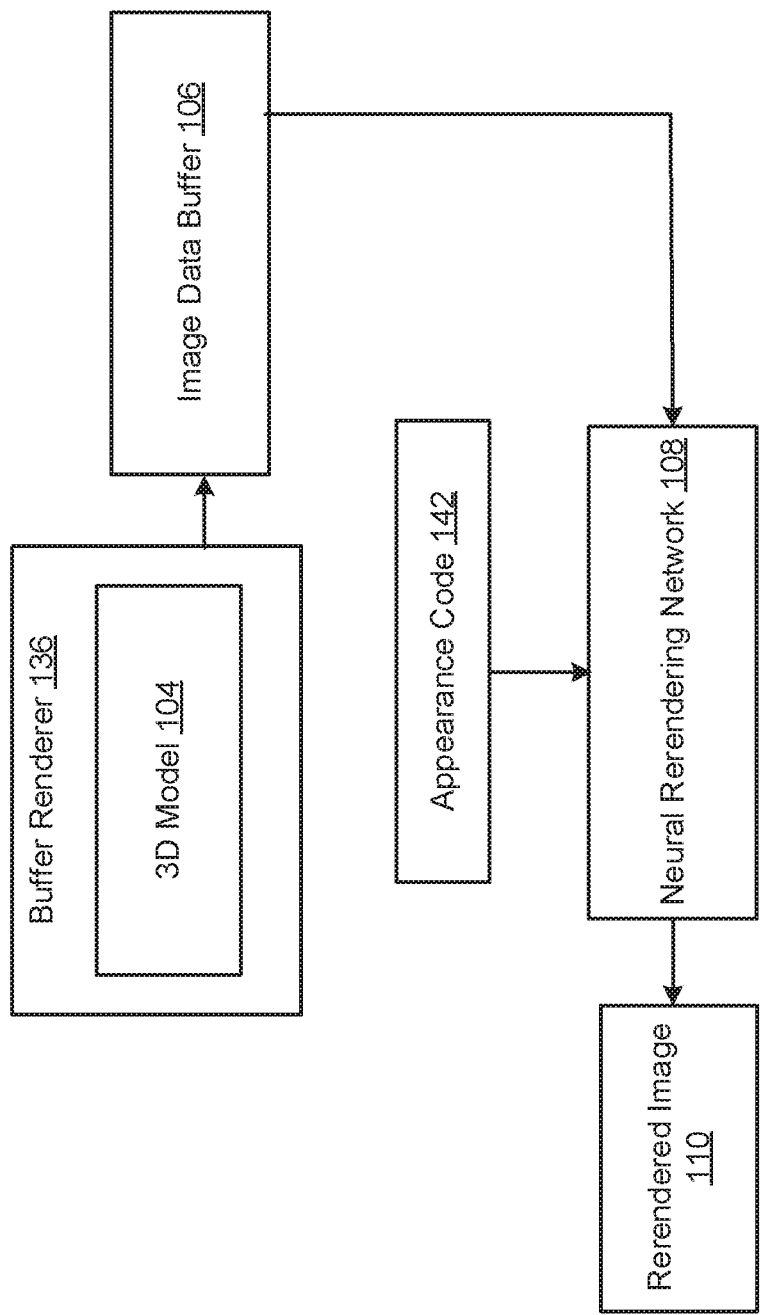
FIG. 18 illustrates an example of a neural rerendering system according to an aspect.

FIG. 18 illustrates an example of the neural rerendering system 100 that generates a rerendered image 110 according to any appearance condition and/or with (or without) transient objects 125. In the example of FIG. 18, it is assumed that the neural rerendering network 108 and an appearance encoder 138 have already been trained. The buffer renderer 136 may receive a viewpoint request that specifies a viewpoint and may render an image data buffer 106 from the 3D model 104 according to the viewpoint. The neural rerendering network 108 may also receive the image data buffer 106 and the appearance code 142 and generate a rerendered image 110 having the requested appearance conditions. In some examples, the appearance condition does not need to be the same as the real photograph taken from the same vantage (which has a fixed appearance). For example, the appearance condition of the rerendered image 110 may be different from an appearance condition of an input image 102 (e.g., the corresponding original image) that has a viewpoint that is the same as the viewpoint of the rerendered image 110. For example, the original image may be sunny, but the rerendered image 110 may be cloudy (or any appearance condition as specified by the appearance code 142). In some examples, the appearance code 142 is an interpolation of the appearance codes of two input images. In some examples, the appearance condition is the same as the original image (e.g., thereby having the same appearance code 142).

In some examples, the neural rerendering network 108 may also receive a transient data omit request that indicates to omit transient objects 125 from the rerendered image 110. If the neural rerendering network 108 receives the transient data omit request, the neural rerendering network 108 may use the semantic label map 124 as a guide to identify the transient objects 125, and then omit them from the rerendered image 110.

Figure 19:
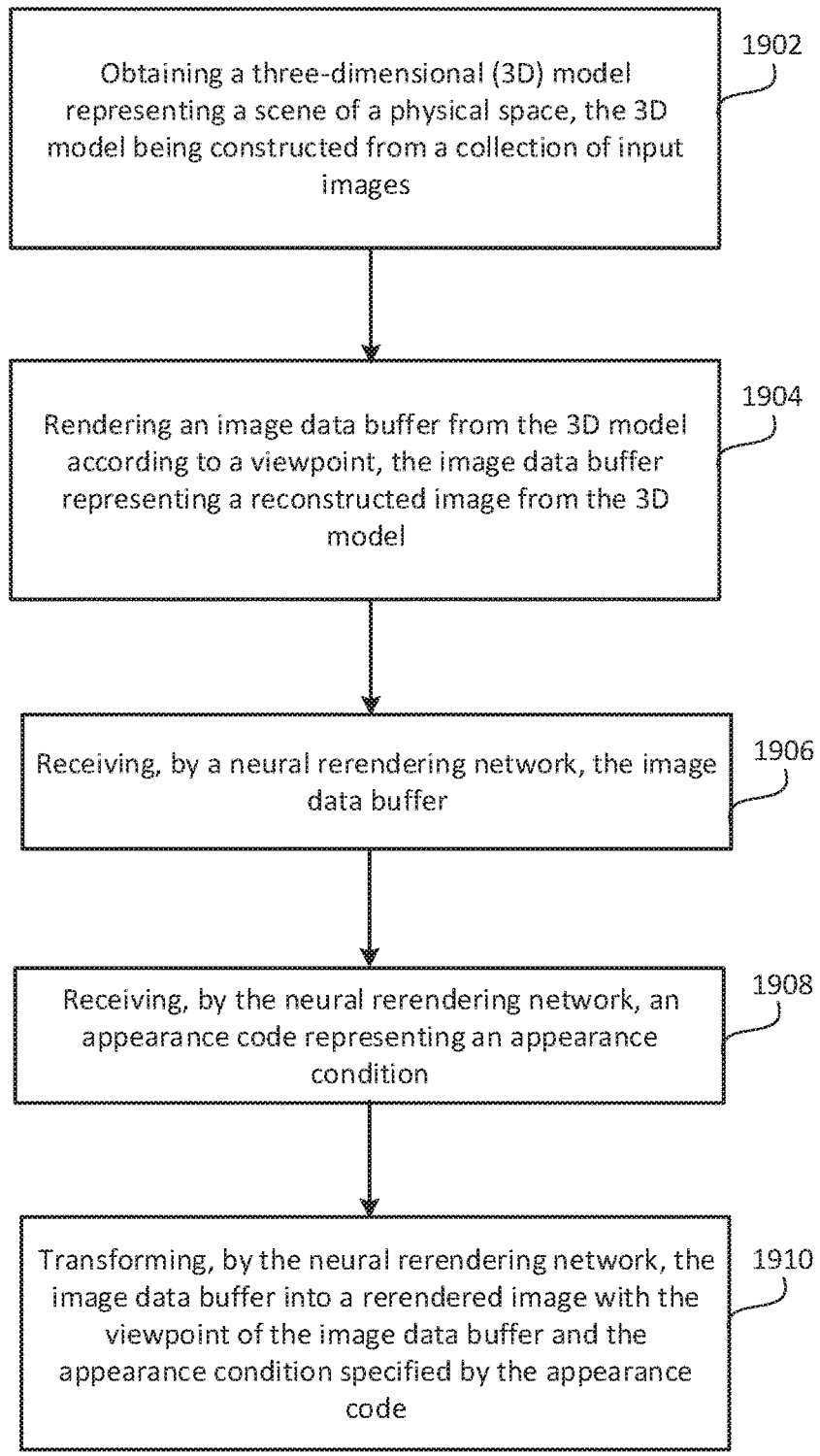
FIG. 19 illustrates a flowchart depicting example operations of the neural rerendering system according to an aspect.

FIG. 19 illustrates a flowchart 1900 depicting example operations of a neural rerendering system 100 according to an aspect.

Operation 1902 includes obtaining a three-dimensional (3D) model 104 representing a scene of a physical space, where the 3D model 104 is constructed from a collection 101 of input images 102. Operation 1904 includes rendering an image data buffer 106 from the 3D model 104 according to a viewpoint, where the image data buffer 106 representing a reconstructed image from the 3D model 104. Operation 1906 includes receiving, by a neural rerendering network 108, the image data buffer 106. Operation 1908 includes receiving, by the neural representing network 108, an appearance code 142 specifying an appearance condition.

Operation 1910 includes transforming, by the neural rerendering network 108, the image data buffer 106 into a rerendered image 110 with the viewpoint of the image data buffer 106 and the appearance condition as specified by the appearance code 142. In some examples, the rerendered image 110 has a resolution higher than resolution of the reconstructed image represented by the image data buffer 106. In some examples, the rerendered image 110 has a higher level of detail as compared to the reconstructed image represented by the image data buffer 106. In some examples, the rerendered image 110 is a more accurate (or faithful) depiction of the physical space as compared to the reconstructed image as represented by the image data buffer 106.

Figure 20:
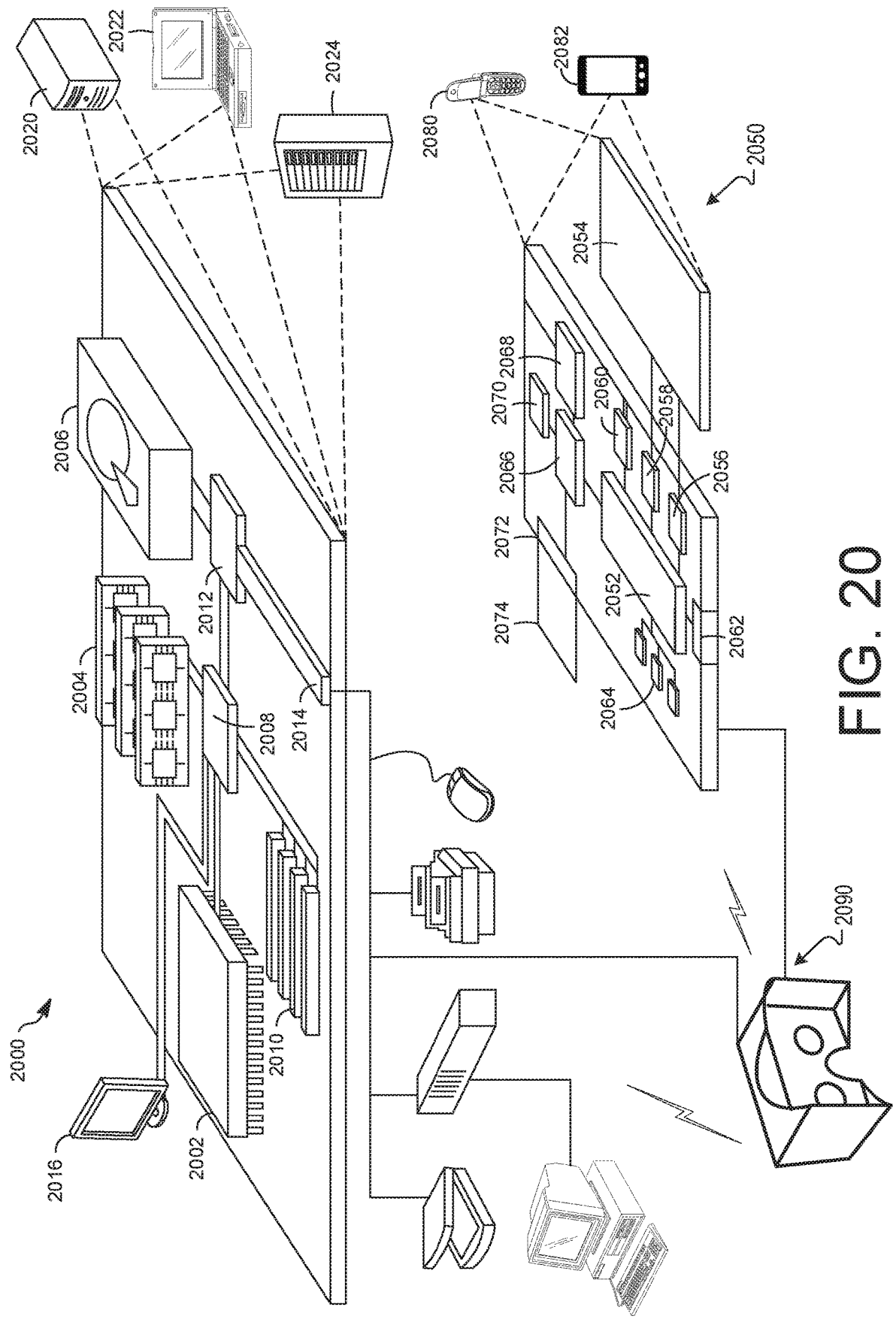
FIG. 20 illustrates example computing devices of the neural rerendering system according to an aspect.

FIG. 20 shows an example of an example computer device 2000 and an example mobile computer device 2050, which may be used with the techniques described here. Computing device 2000 includes a processor 2002, memory 2004, a storage device 2006, a high-speed interface 2008 connecting to memory 2004 and high-speed expansion ports 2010, and a low speed interface 2012 connecting to low speed bus 2014 and storage device 2006. Each of the components 2002, 2004, 2006, 2008, 2010, and 2012, are interconnected using various busses, and may be mounted on a common motherboard or in other manners as appropriate. The processor 2002 can process instructions for execution within the computing device 2000, including instructions stored in the memory 2004 or on the storage device 2006 to display graphical information for a GUI on an external input/output device, such as display 2016 coupled to high speed interface 2008. In other implementations, multiple processors and/or multiple buses may be used, as appropriate, along with multiple memories and types of memory. In addition, multiple computing devices 2000 may be connected, with each device providing portions of the necessary operations (e.g., as a server bank, a group of blade servers, or a multi-processor system).

The memory 2004 stores information within the computing device 2000. In one implementation, the memory 2004 is a volatile memory unit or units. In another implementation, the memory 2004 is a non-volatile memory unit or units. The memory 2004 may also be another form of computer-readable medium, such as a magnetic or optical disk.

The storage device 2006 is capable of providing mass storage for the computing device 2000. In one implementation, the storage device 2006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2004, the storage device 2006, or memory on processor 2002.

The high speed controller 2008 manages bandwidth-intensive operations for the computing device 2000, while the low speed controller 2012 manages lower bandwidth-intensive operations. Such allocation of functions is exemplary only. In one implementation, the high-speed controller 2008 is coupled to memory 2004, display 2016 (e.g., through a graphics processor or accelerator), and to high-speed expansion ports 2010, which may accept various expansion cards (not shown). In the implementation, low-speed controller 2012 is coupled to storage device 2006 and low-speed expansion port 2014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2000 may be implemented in a number of different forms, as shown in the figure. For example, it may be implemented as a standard server 2020, or multiple times in a group of such servers. It may also be implemented as part of a rack server system 2024. In addition, it may be implemented in a personal computer such as a laptop computer 2022. Alternatively, components from computing device 2000 may be combined with other components in a mobile device (not shown), such as device 2050. Each of such devices may contain one or more of computing devices 2000, 2050, and an entire system may be made up of multiple computing devices 2000, 2050 communicating with each other.

Computing device 2050 includes a processor 2052, memory 2064, an input/output device such as a display 2054, a communication interface 2066, and a transceiver 2068, among other components. The device 2050 may also be provided with a storage device, such as a microdrive or other device, to provide additional storage. Each of the components 2050, 2052, 2064, 2054, 2066, and 2068, are interconnected using various buses, and several of the components may be mounted on a common motherboard or in other manners as appropriate.

The processor 2052 can execute instructions within the computing device 2050, including instructions stored in the memory 2064. The processor may be implemented as a chipset of chips that include separate and multiple analog and digital processors. The processor may provide, for example, for coordination of the other components of the device 2050, such as control of user interfaces, applications run by device 2050, and wireless communication by device 2050.

Processor 2052 may communicate with a user through control interface 2058 and display interface 2056 coupled to a display 2054. The display 2054 may be, for example, a TFT LCD (Thin-Film-Transistor Liquid Crystal Display) or an OLED (Organic Light Emitting Diode) display, or other appropriate display technology. The display interface 2056 may comprise appropriate circuitry for driving the display 2054 to present graphical and other information to a user. The control interface 2058 may receive commands from a user and convert them for submission to the processor 2052. In addition, an external interface 2062 may be provided in communication with processor 2052, so as to enable near area communication of device 2050 with other devices. External interface 2062 may provide, for example, for wired communication in some implementations, or for wireless communication in other implementations, and multiple interfaces may also be used.

The memory 2064 stores information within the computing device 2050. The memory 2064 can be implemented as one or more of a computer-readable medium or media, a volatile memory unit or units, or a non-volatile memory unit or units. Expansion memory 2074 may also be provided and connected to device 2050 through expansion interface 2072, which may include, for example, a SIMM (Single In Line Memory Module) card interface. Such expansion memory 2074 may provide extra storage space for device 2050 or may also store applications or other information for device 2050. Specifically, expansion memory 2074 may include instructions to carry out or supplement the processes described above and may include secure information also. Thus, for example, expansion memory 2074 may be provided as a security module for device 2050 and may be programmed with instructions that permit secure use of device 2050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2064, expansion memory 2074, or memory on processor 2052, that may be received, for example, over transceiver 2068 or external interface 2062.

Device 2050 may communicate wirelessly through communication interface 2066, which may include digital signal processing circuitry where necessary. Communication interface 2066 may provide for communications under various modes or protocols, such as GSM voice calls, SMS, EMS, or MIMS messaging, CDMA, TDMA, PDC, WCDMA, CDMA2000, or GPRS, among others. Such communication may occur, for example, through radio-frequency transceiver 2068. In addition, short-range communication may occur, such as using a Bluetooth, Wi-Fi, or other such transceiver (not shown). In addition, GPS (Global Positioning System) receiver module 2070 may provide additional navigation- and location-related wireless data to device 2050, which may be used as appropriate by applications running on device 2050.

Device 2050 may also communicate audibly using audio codec 2060, which may receive spoken information from a user and convert it to usable digital information. Audio codec 2060 may likewise generate audible sound for a user, such as through a speaker, e.g., in a handset of device 2050. Such sound may include sound from voice telephone calls, may include recorded sound (e.g., voice messages, music files, etc.) and may also include sound generated by applications operating on device 2050.

The computing device 2050 may be implemented in a number of different forms, as shown in the figure. For example, it may be implemented as a cellular telephone 2080. It may also be implemented as part of a smart phone 2082, personal digital assistant, or another similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. In addition, the term "module" may include software and/or hardware.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 20 can include sensors that interface with a virtual reality (VR headset 2090). For example, one or more sensors included on a computing device 2050 or other computing device depicted in FIG. 20, can provide input to VR headset 2090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 2050 can use the sensors to determine an absolute position and/or a detected rotation of the computing device in the VR space that can then be used as input to the VR space. For example, the computing device 2050 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion using a laser pointer.

In some implementations, one or more input devices included on, or connected to, the computing device 2050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 2050 when the computing device is incorporated into the VR space can cause a particular action to occur in the VR space.

In some implementations, a touchscreen of the computing device 2050 can be rendered as a touchpad in VR space. A user can interact with the touchscreen of the computing device 2050. The interactions are rendered, in VR headset 2090 for example, as movements on the rendered touchpad in the VR space. The rendered movements can control objects in the VR space.

In some implementations, one or more output devices included on the computing device 2050 can provide output and/or feedback to a user of the VR headset 2090 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 2050 may appear as another object in a computer-generated, 3D environment. Interactions by the user with the computing device 2050 (e.g., rotating, shaking, touching a touchscreen, swiping a finger across a touch screen) can be interpreted as interactions with the object in the VR space. In the example of the laser pointer in a VR space, the computing device 2050 appears as a virtual laser pointer in the computer-generated, 3D environment. As the user manipulates the computing device 2050, the user in the VR space sees movement of the laser pointer. The user receives feedback from interactions with the computing device 2050 in the VR space on the computing device 2050 or on the VR headset 2090.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 2000 is intended to represent various forms of digital computers, such as laptops, desktops, workstations, personal digital assistants, servers, blade servers, mainframes, and other appropriate computers. Computing device 2050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Although the disclosed inventive concepts include those defined in the attached claims, it should be understood that the inventive concepts can also be defined in accordance with the following embodiments:

Embodiment 1 is a method for neural rerendering, there the method includes obtaining a three-dimensional (3D) model representing a scene of a physical space, rendering an image data buffer from the 3D model according to a viewpoint, receiving, by a neural rerendering network, the image data buffer, receiving, by the neural rerendering network, an appearance code representing an appearance condition, and transforming, by the neural rerendering network, the image data buffer into a rerendered image with the viewpoint of the image data buffer and the appearance condition specified by the appearance code.

Embodiment 2 is the method of embodiment 1, wherein the image data buffer represents a reconstructed image from the 3D model.

Embodiment 3 is the method of any one of embodiments 1 through 2, wherein the 3D model is constructed from a collection of input images.

Embodiment 4 is the method of any one of embodiments 1 through 3, wherein the appearance condition of the rerendered image is different from an appearance condition of an input image having a viewpoint that is the same as the viewpoint of the rerendered image.

Embodiment 5 is the method of any one of embodiments 1 through 4, wherein the rerendered image has a resolution higher than a resolution of the reconstructed image (or the image data buffer).

Embodiment 6 is the method of any one of embodiments 1 through 5, wherein the method further includes modifying the appearance code to represent a second appearance condition of the scene, wherein the transforming includes generating the rerendered image according to the modified appearance code such that the rerendered image includes the second appearance condition.

Embodiment 7 is the method of any one of embodiments 1 through 6, wherein the appearance condition of the rerendered image is the same as an appearance condition of an input image having a viewpoint that is the same as the viewpoint of the rerendered image.

Embodiment 8 is the method of any one of embodiments 1 through 7, wherein the method further includes receiving, by the neural rerendering network, a semantic label map indicating a position of a transient object in the scene.

Embodiment 9 is the method of any one of embodiments 1 through 8, wherein the transforming includes generating the rerendered image using the semantic label map as a guide such that the transient object is omitted from the rerendered image.

Embodiment 10 is the method of any one of embodiments 1 through 9, wherein the image data buffer includes the semantic label map.

Embodiment 11 is the method of any one of embodiments 1 through 10, wherein the method includes receiving, by an image-to-image translation network, the image data buffer.

Embodiment 12 is the method of any one of embodiments 1 through 11, wherein the method includes generating, by the image-to-image translation network, the semantic label map based on the image data buffer.

Embodiment 13 is the method of any one of embodiments 1 through 12, wherein the image data buffer includes a plurality of layers.

Embodiment 14 is the method of any one of embodiments 1 through 13, wherein the plurality of layers include a color layer and a depth layer.

Embodiment 15 is the method of any one of embodiments 1 through 14, wherein the transforming includes generating the rerendered image based on the color layer and the depth layer.

Embodiment 16 is the method of any one of embodiments 1 through 15, wherein the method includes generating an aligned dataset using the 3D model.

Embodiment 17 is the method of any one of embodiments 1 through 16, wherein the aligned dataset includes a plurality of pairs of images.

Embodiment 18 is the method of any one of embodiments 1 through 17, wherein each pair includes an input image and an image data buffer rendered from the 3D model.

Embodiment 19 is the method of any one of embodiments 1 through 18, wherein the input image and the image data buffer are from a same point of view.

Embodiment 20 is the method of any one of embodiments 1 through 19, wherein the image data buffer is pixel aligned with the input image.

Embodiment 21 is the method of any one of embodiments 1 through 20, wherein the method includes generating one or more semantic label maps based on portions of the aligned dataset.

Embodiment 22 is the method of any one of embodiments 1 through 21, wherein the semantic label maps indicate positions of transient objects and non-transient objects.

Embodiment 23 is the method of any one of embodiments 1 through 22, wherein the method includes training the neural rerendering network using the aligned dataset and the semantic label maps.

Embodiment 24 is the method of any one of embodiments 1 through 23, wherein the method includes training an appearance encoder to learn appearance code of the scene using the aligned dataset.

Embodiment 25 is the method of any one of embodiments 1 through 24, wherein the method includes training an appearance encoder to learn appearance code of the scene using the aligned dataset with triplet loss.

Embodiment 26 is a system comprising one or more computers and one or more storage devices storing instructions that are operable, when executed by the one or more computers, to cause the one or more computers to perform the method of any one of embodiments 1 through 25.

Embodiment 27 is a computer storage medium encoded with a computer program, the program comprising instructions that are operable, when executed by data processing apparatus, to cause the data processing apparatus to perform the method of any one of embodiments 1 through 25.

Embodiment 28 is a non-transitory computer-readable medium storing executable instructions that when executed by at least one processor are configured to cause the at least one processor to obtain a three-dimensional (3D) model representing a scene of a physical space, render an image data buffer from the 3D model according to a viewpoint, receive, by a neural rerendering network, the image data buffer, receive, by the neural rerendering network, an appearance code representing an appearance condition, and transform, by the neural rerendering network, the image data buffer into a rerendered image such that the rerendered image has the appearance condition specified by the appearance code and the viewpoint of the image data buffer.

Embodiment 29 is the non-transitory computer-readable medium of embodiment 28, wherein the image data buffer represents a reconstructed image from the 3D model.

Embodiment 30 is the non-transitory computer-readable medium of any one of embodiments 28 through 29, wherein the 3D model is constructed from a collection of input images.

Embodiment 31 is the non-transitory computer-readable medium of any one of embodiments 28 through 30, wherein the executable instructions include instructions that cause the at least one processor to receive, by the neural rerendering network, a semantic label map indicating a position of a transient object in the scene.

Embodiment 32 is the non-transitory computer-readable medium of any one of embodiments 28 through 31, wherein the executable instructions include instructions that cause the at least one processor to generate, by the neural rerendering network, the rerendered image using the semantic label map as a guide such that the transient object is omitted from the rerendered image.

Embodiment 33 is the non-transitory computer-readable medium of any one of embodiments 28 through 32, wherein the image data buffer includes the semantic label map.

Embodiment 34 is the non-transitory computer-readable medium of any one of embodiments 28 through 33, wherein the executable instructions include instructions that cause the at least one processor to receive, by an image-to-image translation network, the image data buffer, and generate, by the image-to-image translation network, the semantic label map based on the image data buffer.

Embodiment 35 is the non-transitory computer-readable medium of any one of embodiments 28 through 34, wherein the executable instructions include instructions that cause the at least one processor to receive, by a semantic segmentation network, a ground truth image related to the image data buffer.

Embodiment 36 is the non-transitory computer-readable medium of any one of embodiments 28 through 35, wherein the executable instructions that cause the at least one processor to generate, by the semantic segmentation network, the semantic label map based on the ground truth image.

Embodiment 37 is the non-transitory computer-readable medium of any one of embodiments 28 through 36, wherein the image data buffer includes a plurality of layers.

Embodiment 38 is the non-transitory computer-readable medium of any one of embodiments 28 through 37, wherein the plurality of layers include a color layer and a depth layer.

Embodiment 39 is the non-transitory computer-readable medium of any one of embodiments 28 through 38, wherein the instructions to transform include instructions to generate the rerendered image based on the color layer and the depth layer.

Embodiment 40 is a method according to any one of the embodiments of 28 through 39.

Embodiment 41 is a system comprising one or more computers and one or more storage devices storing instructions that are operable, when executed by the one or more computers, to cause the one or more computers to perform the operations of any one of the embodiments of 28 through 39.

Embodiment 42 is a neural rerendering system that includes a three-dimensional (3D) generator configured to generate a 3D model representing a scene of a physical space based on a collection of input images, and a neural rerendering network configured to transform an image data buffer rendered from the 3D model to a rerendered image.

Embodiment 43 is the neural rerendering system of embodiment 42, further including an appearance encoder configured to encode a plurality of appearance conditions of the scene as appearance code.

Embodiment 44 is the neural rerendering system of any one of embodiment 42 through 43, wherein the neural rerendering network is configured to receive the appearance code such that modification of the appearance code causes the rendered image to be generated according to different appearance conditions.

Embodiment 45 is the neural rerendering system of any one of embodiment 42 through 44, further including a neural network trainer configured to train the neural rerendering network and the appearance encoder using training data.

Embodiment 46 is the neural rerendering system of any one of embodiment 42 through 45, wherein the neural network trainer is configured to the neural rerendering network and the appearance encoder according to a plurality of training stages.

Embodiment 47 is the neural rerendering system of any one of embodiment 42 through 46, wherein the plurality of training stages includes an appearance training stage in which the appearance encoder is trained.

Embodiment 48 is the neural rerendering system of any one of embodiment 42 through 47, wherein the plurality of training stages include a rerendering training stage in which the neural rerendering network is trained.

Embodiment 49 is the neural rerendering system of any one of embodiment 42 through 48, wherein the plurality of training include a tuning training stage in which the appearance encoder and the neural rerendering network are jointly trained.

Embodiment 50 is the neural rerendering system of any one of embodiment 42 through 49, wherein the 3D model is a point cloud generated from structure-from motion (Sfm) and multi-view stereo (MVS) techniques.

Embodiment 51 is the neural rerendering system of any one of embodiment 42 through 50, wherein the image data buffer includes a plurality of layers, the plurality of layers including a color layer, a depth layer, and a semantic label map layer indicating a position of a transient object.

Embodiment 52 is the neural rerendering system of any one of embodiment 42 through 51, wherein the neural rerendering network is a first neural network, and the appearance encoder is a second neural network.

Embodiment 53 is a method that includes operations of the neural rerendering system of any one of embodiments 42 through 52.

Embodiment 54 is a computer storage medium encoded with a computer program, the program comprising instructions that are operable, when executed by data processing apparatus, to cause the data processing apparatus to perform the operations of the neural rerendering system of any one of embodiments 42 through 52.

What is claimed is:

1. A method for neural rerendering, the method comprising:
    obtaining a three-dimensional (3D) model representing a scene of a physical space, the 3D model being constructed from a collection of input images;
    encoding, by an appearance encoder, a plurality of appearance conditions of the physical space as an appearance code, the appearance code including first values that represent a first appearance condition and second values that represent a second appearance condition;
    rendering an image data buffer from the 3D model according to a first viewpoint, the image data buffer representing a reconstructed image from the 3D model;
    generating a semantic label map using the image data buffer or an input image that corresponds to the image data buffer; and
    generating, by a neural rerendering network, a rerendered image using the image data buffer, the semantic label map, and the first values of the appearance code as inputs to the neural rerendering network such that the rerendered image has the first viewpoint of the image data buffer and the first appearance condition,
    the appearance encoder being trained to estimate the appearance code using image data buffers and input images, the neural rerendering network being trained to estimate rerendered images using semantic label maps and the appearance code of the already-trained appearance encoder.

2. The method of claim 1, wherein the first appearance condition of the rerendered image is different from an appearance condition of the input image, the input image having a viewpoint that is the same as the first viewpoint of the rerendered image.

3. The method of claim 1, wherein the plurality of appearance conditions are encoded by correlating lighting in each input image with scene geometry in a corresponding image data buffer such that the appearance code is independent of viewpoint.

4. The method of claim 1, wherein the appearance encoder is trained to encode the plurality of appearance conditions without using the neural rerendering network during at least a portion of time.

5. The method of claim 1, further comprising:
    receiving, by an image-to-image translation network, the image data buffer; and
    generating, by the image-to-image translation network, the semantic label map based on a color layer and depth layer of the image data buffer.

6. The method of claim 1, wherein the image data buffer includes a plurality of layers, the plurality of layers including a color layer and a depth layer, wherein the color layer and the depth layer are used as inputs to the neural rerendering network.

7. The method of claim 1, further comprising:
    generating an aligned dataset using the 3D model, the aligned dataset including a plurality of pairs of images, each pair including an input image and an image data buffer rendered from the 3D model, the input image and the image data buffer of each pair being from a same viewpoint, the image data buffer and the input image of each pair being pixel aligned; and
    generating the semantic label maps based on portions of the aligned dataset, the semantic label maps indicating locations of objects predicted to move out of the physical space,
    wherein the neural rerendering network is trained using the aligned dataset, the plurality of semantic label maps, and the appearance code of the already-trained appearance encoder.

8. The method of claim 7, wherein the appearance encoder is trained using the aligned dataset without using the neural rerendering network for a period of time.

9. The method of claim 1, further comprising:
    receiving a transient data omit request that indicates to omit at least one object predicted to move out of the physical space, wherein the rerendered image is generated without the at least one object predicted to move out of the physical space.

10. A non-transitory computer-readable medium storing executable instructions that when executed by at least one processor are configured to cause the at least one processor to:
obtain a three-dimensional (3D) model representing a scene of a physical space, the 3D model being constructed from a collection of input images;
encode, by an appearance encoder, a plurality of appearance conditions of the physical space as an appearance code, the appearance code including first values that represent a first appearance condition and second values that represent a second appearance condition;
render an image data buffer from the 3D model according to a first viewpoint, the image data buffer representing a reconstructed image from the 3D model;
generate a semantic label map using the image data buffer or an input image that corresponds to the image data buffer, the semantic label map indicating a location of an object predicted to move out of the physical space; and
generate, by a neural rerendering network, a rerendered image using the image data buffer, the semantic label map, and the first values of the appearance code such that the rerendered image has the first appearance condition and the first viewpoint of the image data buffer,
the appearance encoder being trained to estimate the appearance code using image data buffers and input images, the neural rerendering network being trained to estimate rerendered images using semantic label maps and the appearance code of the already-trained appearance encoder.

11. The non-transitory computer-readable medium of claim 10, wherein the image data buffer includes a deferred shading buffer or a geometry buffer, the image data buffer including a color layer and a depth layer, the image data buffer including the semantic label map.

12. The non-transitory computer-readable medium of claim 10, wherein the executable instructions include instructions that cause the at least one processor to:
receive, by an image-to-image translation network, the image data buffer; and
generate, by the image-to-image translation network, the semantic label map based on the image data buffer, the image-to-image translation network including a neural network that is different from the appearance encoder and the neural rerendering network.

13. The non-transitory computer-readable medium of claim 10, wherein the executable instructions include instructions that cause the at least one processor to:
receive, by a semantic segmentation network, a ground truth image corresponding to the image data buffer; and
generate, by the semantic segmentation network, the semantic label map based on the ground truth image.

14. The non-transitory computer-readable medium of claim 10, wherein the image data buffer includes a plurality of layers, the plurality of layers including a color layer, a depth layer, and a surface normal layer, wherein at least the color layer and the depth layer are used as inputs to the neural rerendering network.

15. A neural rerendering system comprising:
a three-dimensional (3D) generator configured to generate a 3D model representing a scene of a physical space based on a collection of input images;
a neural rerendering network configured to generate a rerendered image using an image data buffer rendered from the 3D model and a semantic label map as inputs to the neural rerendering network, the semantic label map indicating a location of an object predicted to move out of the physical space;
an appearance encoder configured to encode a plurality of appearance conditions of the scene as an appearance code, the appearance code including first values that represent a first appearance condition and second values that represent a second appearance condition, the neural rerendering network configured to receive the first values of the appearance code such that the rerendered image is generated with the first appearance condition; and
a neural network trainer configured to train the appearance encoder to estimate the appearance code using image data buffers and input images, the neural network trainer configured to train the neural rerendering network to estimate rerendered images using semantic label maps and the appearance code of the already-trained appearance encoder.

16. The neural rerendering system of claim 15, wherein the neural network trainer is configured to train the neural rerendering network and the appearance encoder according to a plurality of training stages, the plurality of training stages includes an appearance training stage in which the appearance encoder is trained without using the neural rerendering network, a rerendering training stage in which the neural rerendering network is trained in which weights of the appearance encoder do not change, and a tuning training stage in which the appearance encoder and the neural rerendering network are jointly trained.

17. The neural rerendering system of claim 15, wherein the 3D model is a point cloud generated from structure-from motion (Sfm) and multi-view stereo (MVS) techniques.

18. The neural rerendering system of claim 15, wherein the image data buffer includes a plurality of layers, each of the plurality of layers providing information on a per-pixel basis, the plurality of layers including a color layer, a depth layer, and a surface normal layer.

* * * * *